US011561335B2

(12) United States Patent
Danziger et al.

(10) Patent No.: US 11,561,335 B2
(45) Date of Patent: Jan. 24, 2023

(54) LIGHT-GUIDE OPTICAL ELEMENT EMPLOYING COMPLEMENTARY COATED PARTIAL REFLECTORS, AND LIGHT-GUIDE OPTICAL ELEMENT HAVING REDUCED LIGHT SCATTERING

(71) Applicant: Lumus Ltd., Ness Ziona (IL)

(72) Inventors: Yochay Danziger, Kfar Vradim (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/768,983

(22) PCT Filed: Dec. 3, 2020

(86) PCT No.: PCT/IL2020/051249
§ 371 (c)(1),
(2) Date: Apr. 14, 2022

(87) PCT Pub. No.: WO2021/111447
PCT Pub. Date: Jun. 10, 2021

(65) Prior Publication Data
US 2022/0357499 A1 Nov. 10, 2022

Related U.S. Application Data

(60) Provisional application No. 62/943,867, filed on Dec. 5, 2019.

(51) Int. Cl.
*F21V 8/00* (2006.01)
*G02B 27/01* (2006.01)

(52) U.S. Cl.
CPC ........ *G02B 6/0035* (2013.01); *G02B 27/0172* (2013.01)

(58) Field of Classification Search
None
See application file for complete search history.

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

| CN | 101542346 | 9/2009 |
| CN | 103837988 | 6/2014 |

(Continued)

OTHER PUBLICATIONS

S.Chattopadhyay el al: "Anti-reflecting and pholonic nanostructures", Materiais Science and Engineering: R: Repots, ol. 69, No. 1-3, Jun. 20, 2010, pp. 1-35.

(Continued)

*Primary Examiner* — Jerry Rahll
(74) *Attorney, Agent, or Firm* — Mark M. Friedman

(57) ABSTRACT

A transparent substrate has two parallel faces and guides collimated image light by internal reflection. A first set of internal surfaces is deployed within the substrate oblique to the parallel faces. A second set of internal surfaces is deployed within the substrate parallel to, interleaved and in overlapping relation with the first set of internal surfaces. Each of the internal surfaces of the first set includes a first coating having a first reflection characteristic to be at least partially reflective to at least a first subset of components of incident light. Each of the internal surfaces of the second set includes a second coating having a second reflection characteristic complementary to the first reflection characteristic to be at least partially reflective to at least a second subset (Continued)

of components of incident light. The sets of internal surfaces cooperate to reflect all components of light from the first and second subsets.

25 Claims, 11 Drawing Sheets

(56) References Cited

U.S. PATENT DOCUMENTS

| | | | |
|---|---|---|---|
| 2,886,911 A | 5/1959 | Hardesty | |
| 3,491,245 A | 1/1970 | Hardesty | |
| 3,626,394 A | 12/1971 | Nelson et al. | |
| 3,667,621 A | 6/1972 | Barlow | |
| 3,677,621 A | 7/1972 | Smith | |
| 3,737,212 A | 6/1973 | Antonson et al. | |
| 3,802,763 A | 4/1974 | Cook et al. | |
| 3,857,109 A | 12/1974 | Pilloff | |
| 3,873,209 A | 3/1975 | Schinke et al. | |
| 3,940,204 A | 2/1976 | Withrington | |
| 4,084,883 A | 4/1978 | Eastman et al. | |
| 4,191,446 A | 3/1980 | Arditty et al. | |
| 4,309,070 A | 1/1982 | St Leger Searle | |
| 4,331,387 A | 5/1982 | Wentz | |
| 4,516,828 A | 5/1985 | Steele | |
| 4,613,216 A | 9/1986 | Herbec et al. | |
| 4,711,512 A | 12/1987 | Upatnieks | |
| 4,715,684 A | 12/1987 | Gagnon | |
| 4,720,189 A | 1/1988 | Heynen et al. | |
| 4,775,217 A | 10/1988 | Ellis | |
| 4,798,448 A | 1/1989 | van Raalte | |
| 4,805,988 A | 2/1989 | Dones | |
| 4,932,743 A | 6/1990 | Isobe et al. | |
| 4,978,952 A | 12/1990 | Irwin | |
| 5,033,828 A | 7/1991 | Haruta | |
| 5,076,664 A * | 12/1991 | Migozzi | G09B 9/326 |
| | | | 359/630 |
| 5,096,520 A | 3/1992 | Faris | |
| 5,157,526 A | 10/1992 | Kondo et al. | |
| 5,208,800 A | 5/1993 | Isobe et al. | |
| 5,231,642 A | 7/1993 | Scifres et al. | |
| 5,235,589 A | 8/1993 | Yokomori et al. | |
| 5,301,067 A | 4/1994 | Bleier et al. | |
| 5,341,230 A | 8/1994 | Smith | |
| 5,353,134 A | 10/1994 | Michel et al. | |
| 5,367,399 A | 11/1994 | Kramer | |
| 5,369,415 A | 11/1994 | Richard et al. | |
| 5,430,505 A | 7/1995 | Katz | |
| 5,453,877 A | 9/1995 | Gerbe et al. | |
| 5,543,877 A | 8/1996 | Takashi et al. | |
| 5,555,329 A | 9/1996 | Kuper et al. | |
| 5,619,601 A | 4/1997 | Akashi et al. | |
| 5,650,873 A | 7/1997 | Gal et al. | |
| 5,680,209 A | 10/1997 | Maechler | |
| 5,708,449 A | 1/1998 | Heacock et al. | |
| 5,712,694 A | 1/1998 | Taira et al. | |
| 5,724,163 A | 3/1998 | David | |
| 5,751,480 A | 5/1998 | Kitagishi | |
| 5,764,412 A | 6/1998 | Suzuki et al. | |
| 5,829,854 A | 11/1998 | Jones | |
| 5,883,684 A | 3/1999 | Millikan et al. | |
| 5,896,232 A | 4/1999 | Budd et al. | |
| 5,919,601 A | 7/1999 | Nguyen et al. | |
| 5,966,223 A | 10/1999 | Yaakov et al. | |
| 5,982,536 A | 11/1999 | Swan | |
| 6,021,239 A | 2/2000 | Minami et al. | |
| 6,023,372 A | 2/2000 | Spitzer et al. | |
| 6,052,500 A | 4/2000 | Takano et al. | |
| 6,091,548 A | 7/2000 | Chen | |
| 6,144,347 A | 11/2000 | Mizoguchi et al. | |
| 6,154,321 A | 11/2000 | Melville et al. | |
| 6,222,676 B1 | 4/2001 | Togino et al. | |
| 6,239,092 B1 | 5/2001 | Papasso et al. | |
| 6,264,328 B1 | 7/2001 | Williams | |
| 6,322,256 B1 | 11/2001 | Inada et al. | |
| 6,324,330 B1 | 11/2001 | Stites | |
| 6,349,001 B1 | 2/2002 | Spitzer | |
| 6,362,861 B1 | 3/2002 | Hertz et al. | |
| 6,384,982 B1 | 5/2002 | Spitzer | |
| 6,388,814 B2 | 5/2002 | Tanaka | |
| 6,404,550 B1 | 6/2002 | Yajima | |
| 6,404,947 B1 | 6/2002 | Matsuda | |
| 6,490,104 B1 | 12/2002 | Gleckman et al. | |
| 6,509,982 B2 | 1/2003 | Steiner | |
| 6,519,400 B2 | 2/2003 | Biscardi et al. | |
| 6,542,307 B2 | 4/2003 | Gleckman et al. | |
| 6,556,282 B2 | 4/2003 | Jamieson et al. | |
| 6,577,411 B1 | 6/2003 | David | |
| 6,580,529 B1 | 6/2003 | Amitai et al. | |
| 6,671,100 B1 | 12/2003 | McRuer | |
| 6,690,513 B2 | 2/2004 | Hulse et al. | |
| 6,710,902 B2 | 3/2004 | Takeyama | |
| 6,762,801 B2 | 7/2004 | Weiss et al. | |
| 6,775,432 B2 | 8/2004 | Basu | |
| 6,791,760 B2 | 9/2004 | Janeczko et al. | |
| 6,798,579 B2 | 9/2004 | Robinson et al. | |
| 6,799,859 B1 | 10/2004 | Kozo | |
| 6,805,490 B2 | 10/2004 | Ievola | |
| 6,829,095 B2 | 12/2004 | Amitai | |
| 6,847,488 B2 | 1/2005 | Travis | |
| 6,880,931 B2 | 4/2005 | Moliton et al. | |
| 6,927,694 B1 | 9/2005 | Smith et al. | |
| 6,942,925 B1 | 9/2005 | Lazarev et al. | |
| 7,016,113 B2 | 3/2006 | Choi et al. | |
| 7,021,777 B2 | 4/2006 | Amitai | |
| 7,088,664 B2 | 8/2006 | Kim et al. | |
| 7,175,304 B2 | 2/2007 | Wadia et al. | |
| 7,205,960 B2 | 4/2007 | David | |
| 7,355,795 B1 | 4/2008 | Yamazaki et al. | |
| 7,391,573 B2 | 6/2008 | Amitai | |
| 7,405,881 B2 | 7/2008 | Shimizu et al. | |
| 7,418,170 B2 | 8/2008 | Mukawa et al. | |
| 7,430,355 B2 | 9/2008 | Heikenfeld et al. | |
| 7,448,170 B2 | 11/2008 | Milovan et al. | |
| 7,570,859 B1 | 8/2009 | DeJong | |
| 7,589,901 B2 | 9/2009 | DeJong et al. | |
| 7,613,373 B1 | 11/2009 | DeJong | |
| 7,653,268 B1 | 1/2010 | DeJong | |
| 7,724,443 B2 | 5/2010 | Amitai | |
| 7,751,122 B2 | 7/2010 | Amitai | |
| 7,778,508 B2 | 8/2010 | Hirayama | |
| 7,839,575 B2 | 11/2010 | DeJong et al. | |
| 7,949,214 B2 | 5/2011 | Dejong | |
| 7,995,275 B2 | 8/2011 | Maeda et al. | |
| 8,035,872 B2 | 10/2011 | Ouchi | |
| 8,187,481 B1 | 5/2012 | Hobbs | |
| 8,369,019 B2 | 2/2013 | Baker | |
| 8,391,668 B2 | 3/2013 | Dejong | |
| 8,472,119 B1 | 6/2013 | Kelly | |
| 8,531,773 B2 | 9/2013 | Dejong | |
| 8,548,290 B2 | 10/2013 | Travers et al. | |
| 8,649,099 B2 | 2/2014 | Schultz | |
| 8,655,178 B2 | 2/2014 | Capron et al. | |
| 8,665,178 B1 | 3/2014 | Wang | |
| 8,666,208 B1 | 3/2014 | Amirparviz | |
| 8,736,963 B2 | 5/2014 | Robbins et al. | |
| 8,743,464 B1 | 6/2014 | Amirparviz | |
| 8,848,289 B2 | 9/2014 | Amirparviz et al. | |
| 8,873,148 B1 | 10/2014 | Gupta et al. | |
| 8,913,865 B1 | 12/2014 | Bennett | |
| 9,541,762 B2 | 1/2017 | Mukawa et al. | |
| 9,568,738 B2 | 2/2017 | Mansharof et al. | |
| 9,766,459 B2 | 9/2017 | Alton et al. | |
| 9,791,703 B1 | 10/2017 | Vallius et al. | |
| 9,798,061 B2 | 10/2017 | Hsiao et al. | |
| 9,805,633 B2 | 10/2017 | Zheng | |
| 9,933,684 B2 | 4/2018 | Brown et al. | |
| 10,222,535 B2 | 3/2019 | Remhof et al. | |
| 10,302,957 B2 | 5/2019 | Sissom | |
| 10,317,679 B2 | 6/2019 | Ayres et al. | |
| 10,437,068 B2 * | 10/2019 | Weng | G02B 6/0015 |
| 10,558,044 B2 | 2/2020 | Pan | |
| 10,564,430 B2 | 2/2020 | Amitai et al. | |
| 10,571,699 B1 | 2/2020 | Parsons et al. | |

(56) References Cited

U.S. PATENT DOCUMENTS

| | | |
|---|---|---|
| 10,962,787 B1 | 3/2021 | Lou et al. |
| 11,054,581 B2 | 7/2021 | Ayres et al. |
| 11,187,902 B2 | 11/2021 | Urness et al. |
| 11,262,564 B2 | 3/2022 | Tanaka |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai |
| 2003/0197938 A1 | 10/2003 | Schmidt et al. |
| 2003/0218718 A1 | 11/2003 | Moliton et al. |
| 2004/0032660 A1 | 2/2004 | Amitai |
| 2004/0033528 A1 | 2/2004 | Amitai |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0078388 A1 | 4/2005 | Amitai |
| 2005/0083592 A1 | 4/2005 | Amitai |
| 2005/0084210 A1 | 4/2005 | Cha |
| 2005/0174641 A1 | 8/2005 | Greenberg et al. |
| 2005/0174658 A1 | 8/2005 | Long et al. |
| 2005/0180687 A1 | 8/2005 | Amitai |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0268421 A1 | 11/2006 | Shimizu et al. |
| 2007/0007085 A1 | 3/2007 | Hirayama |
| 2007/0070859 A1 | 3/2007 | Hirayama |
| 2007/0091445 A1 | 4/2007 | Amitai |
| 2007/0097513 A1 | 5/2007 | Amitai |
| 2007/0155277 A1 | 7/2007 | Amitai |
| 2007/0165192 A1 | 7/2007 | Prior |
| 2008/0025667 A1 | 1/2008 | Amitai |
| 2008/0094586 A1 | 4/2008 | Hirayama |
| 2008/0106775 A1 | 5/2008 | Amitai et al. |
| 2008/0151375 A1 | 6/2008 | Lin |
| 2008/0151379 A1* | 6/2008 | Amitai ................ G02B 27/283 359/629 |
| 2008/0186604 A1 | 8/2008 | Amitai |
| 2008/0192239 A1 | 8/2008 | Otosaka |
| 2008/0198471 A1 | 8/2008 | Amitai |
| 2008/0278812 A1 | 11/2008 | Amitai |
| 2008/0285140 A1 | 11/2008 | Amitai |
| 2009/0010023 A1 | 1/2009 | Kanade et al. |
| 2009/0052046 A1 | 2/2009 | Amitai |
| 2009/0052047 A1 | 2/2009 | Amitai |
| 2009/0059380 A1 | 3/2009 | Moliton et al. |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0027289 A1 | 2/2010 | Aiki et al. |
| 2010/0053148 A1 | 3/2010 | Khazeni et al. |
| 2010/0171680 A1 | 7/2010 | Lapidot et al. |
| 2010/0201953 A1 | 8/2010 | Freeman |
| 2010/0202128 A1 | 8/2010 | Saccomanno |
| 2010/0214635 A1 | 8/2010 | Sasaki et al. |
| 2010/0220295 A1 | 9/2010 | Mukawa et al. |
| 2010/0278480 A1 | 11/2010 | Vasylyev |
| 2010/0291489 A1 | 11/2010 | Moskovits et al. |
| 2011/0096566 A1 | 4/2011 | Tsai et al. |
| 2011/0109880 A1 | 5/2011 | Nummela |
| 2011/0176218 A1 | 7/2011 | Noui |
| 2012/0039576 A1 | 2/2012 | Dangel et al. |
| 2012/0044572 A1 | 2/2012 | Simmonds et al. |
| 2012/0147361 A1 | 6/2012 | Mochizuki et al. |
| 2012/0179369 A1 | 7/2012 | Lapidot et al. |
| 2012/0206811 A1 | 8/2012 | Mukawa et al. |
| 2013/0135749 A1 | 5/2013 | Akutsu et al. |
| 2013/0150430 A1 | 6/2013 | Robbins et al. |
| 2013/0163089 A1 | 6/2013 | Bohn |
| 2013/0208362 A1 | 8/2013 | Bohn et al. |
| 2013/0025043 A1 | 9/2013 | Robbins et al. |
| 2013/0150431 A1 | 9/2013 | Robbins et al. |
| 2013/0229717 A1 | 9/2013 | Amitai |
| 2013/0242392 A1 | 9/2013 | Amirparviz |
| 2013/0250430 A1 | 9/2013 | Robbuns et al. |
| 2013/0250431 A1 | 9/2013 | Robbins et al. |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0019801 A1 | 7/2014 | Lamb et al. |
| 2014/0185142 A1 | 7/2014 | Gupta et al. |
| 2014/0192418 A1 | 7/2014 | Suzuki |
| 2014/0226215 A1 | 8/2014 | Komatsu et al. |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0182348 A1 | 7/2015 | Siegal et al. |
| 2015/0182748 A1 | 7/2015 | Gefen et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0277127 A1 | 10/2015 | Amitai |
| 2015/0289762 A1 | 10/2015 | Popovich et al. |
| 2015/0293360 A1 | 10/2015 | Amitai |
| 2015/0338655 A1 | 11/2015 | Sawada et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0031456 A1 | 10/2016 | Jones et al. |
| 2016/0313567 A1 | 10/2016 | Kurashige |
| 2016/0341964 A1 | 11/2016 | Amitai |
| 2016/0349518 A1 | 12/2016 | Amitai et al. |
| 2017/0003504 A1 | 1/2017 | Vallius |
| 2017/0023761 A1 | 1/2017 | Dural et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0122725 A1 | 5/2017 | Yeoh |
| 2017/0242249 A1 | 8/2017 | Wall |
| 2017/0276947 A1 | 9/2017 | Yokoyama |
| 2017/0285346 A1* | 10/2017 | Pan ..................... G02B 27/145 |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0101087 A1 | 4/2018 | Shiobara |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |

(56) References Cited

U.S. PATENT DOCUMENTS

| | | |
|---|---|---|
| 2019/0011710 A1 | 1/2019 | Amitai |
| 2019/0056600 A1 | 2/2019 | Danziger et al. |
| 2019/0064518 A1 | 2/2019 | Danziger |
| 2019/0086674 A1 | 3/2019 | Sinay et al. |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1* | 7/2019 | Danziger ............ G02B 6/0035 |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293838 A1 | 9/2019 | Haba et al. |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0034127 A1 | 1/2020 | Ayres et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0225476 A1 | 7/2020 | Urness et al. |
| 2020/0241308 A1 | 7/2020 | Danziger et al. |
| 2020/0249481 A1 | 8/2020 | Danziger et al. |
| 2020/0278554 A1 | 9/2020 | Schultz et al. |
| 2020/0278557 A1 | 9/2020 | Greenstein et al. |
| 2020/0284967 A1 | 9/2020 | Schowengerdt et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1* | 1/2021 | Amitai ............... G02B 27/0176 |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0101245 A1 | 4/2021 | Han et al. |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004007 A1 | 1/2022 | Bhakta et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043269 A1 | 2/2022 | Maziel |
| 2022/0043272 A1 | 2/2022 | Amitai |
| 2022/0057643 A1 | 2/2022 | Eisenfeld et al. |
| 2022/0075194 A1 | 3/2022 | Ronen et al. |
| 2022/0082838 A1 | 3/2022 | Grabarnik et al. |
| 2022/0091037 A1 | 3/2022 | Aldaag et al. |
| 2022/0091320 A1 | 3/2022 | Danziger |
| 2022/0091413 A1 | 3/2022 | Grabarnik et al. |
| 2022/0099885 A1 | 3/2022 | Ronen et al. |
| 2022/0100032 A1 | 3/2022 | Ronen et al. |

FOREIGN PATENT DOCUMENTS

| | | |
|---|---|---|
| CN | 107238928 | 10/2017 |
| CN | 206649211 | 11/2017 |
| DE | 1422172 | 11/1970 |
| DE | 19725262 | 12/1998 |
| DE | 102013106392 | 12/2014 |
| EP | 0380035 | 8/1990 |
| EP | 0399865 | 11/1990 |
| EP | 0543718 | 5/1993 |
| EP | 0566004 | 10/1993 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 1514977 | 6/1978 |
| GB | 2220081 | 12/1989 |
| GB | 2272980 | 6/1994 |
| GB | 2278222 | 11/1994 |
| GB | 2278888 | 12/1994 |
| GB | 2495398 | 4/2013 |
| JP | H08-070782 | 3/1996 |
| JP | 1996313846 | 11/1996 |
| JP | 2002539498 | 11/2002 |
| JP | 2003140081 | 5/2003 |
| JP | 2004527801 | 9/2004 |
| JP | 2005084522 | 3/2005 |
| JP | 2006145644 | 6/2006 |
| JP | 2010044172 | 2/2010 |
| JP | 2012-037761 U | 2/2012 |
| JP | 2012058404 | 3/2012 |
| JP | 2012123936 | 6/2012 |
| JP | 2016028275 | 2/2016 |
| WO | 0004407 | 1/2000 |
| WO | 0063738 | 10/2000 |
| WO | 0195025 | 12/2001 |
| WO | 2005093493 | 10/2005 |
| WO | 2006098097 | 9/2006 |
| WO | 2007054928 | 5/2007 |
| WO | 2009074638 | 6/2009 |
| WO | 2011130720 | 10/2011 |
| WO | 2013065656 | 5/2013 |
| WO | 2015081313 | 6/2015 |
| WO | WO2015012280 | 3/2017 |
| WO | 2017106873 | 6/2017 |
| WO | 2018/013307 | 1/2018 |
| WO | 2021220267 | 11/2021 |
| WO | 2021229563 | 11/2021 |

OTHER PUBLICATIONS

Petros Stavroulakis et al: Suppression of backscattered diffraction from sub-wavelenght "moth-eye" arrays References and Links/ Optics Express 1, Endeavour Nanotechnology Zoolog_ Sci_ Philos_ Trans_ J_ Mod_ Opt Appl ppt. Opt. Acta {Lond.) Appl. Opt. Appl. Opt. Opt. Lett. Jpn.☐Appl. Pjys. J. Ceram. Soc. Jpn. Opt. Commun. App;. Opt ppt. Lett. Nanotechno, Jan. 1, 1967, pp. 79-84.

Chin-Hao Chang el al: "Nanoslrulured gradient-index antireflection diffractive optics", Optics Letters, vol. 36, No. 12, Jun. 5, 2011, p. 2354.

Piaoyin Yang et al: "Antireflection effects at nanostructured material interfaces and the suppression of thin-film nterference", Nanotechnology, vol. 24, No. 23, May 15, 2013, p. 235202.

R.. J_ Weiblen el al: "Optimized moth-eye anti-reflective structures for As_2S_3 chalcogenlide optical fibers", Optics Express vol. 24, Issue 10, pp. 10172-10187 (2016) •https://doi.org/10.1364/OE.24. 010172.

(56) References Cited

OTHER PUBLICATIONS

S.Chattopadhyay el al: "Anti-reflecting and pholonic nanostruclures", Materials Science and Engineering: R: Repots, ol. 69, No. 1-3, Jun. 20, 2010, pp. 1-35.
Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

\* cited by examiner

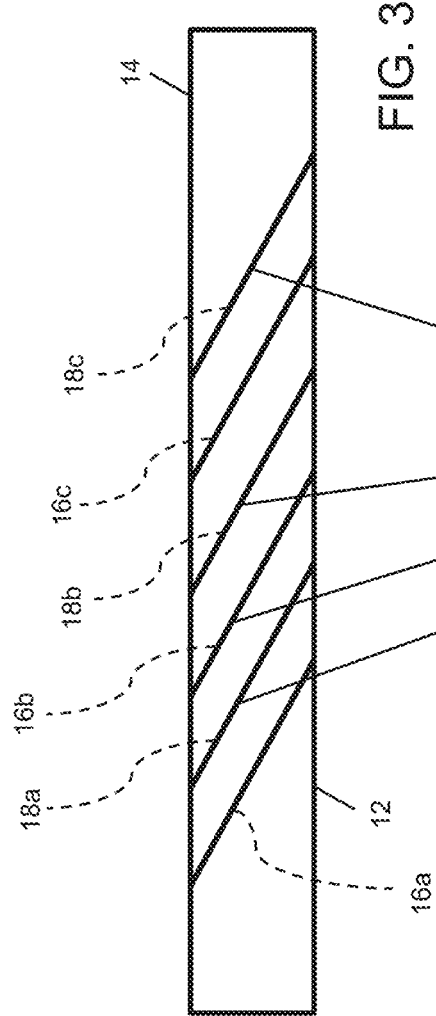
FIG. 3
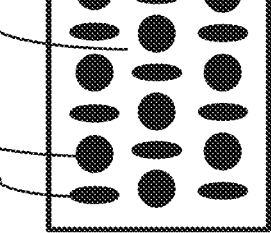
FIG. 6
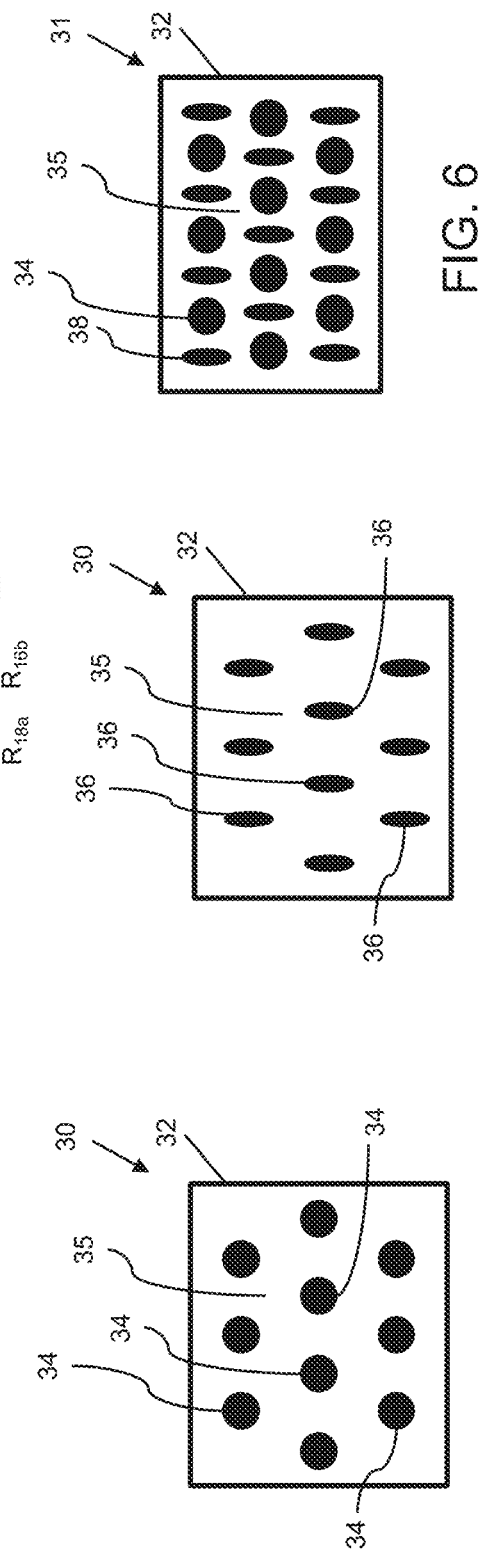
FIG. 5
FIG. 4

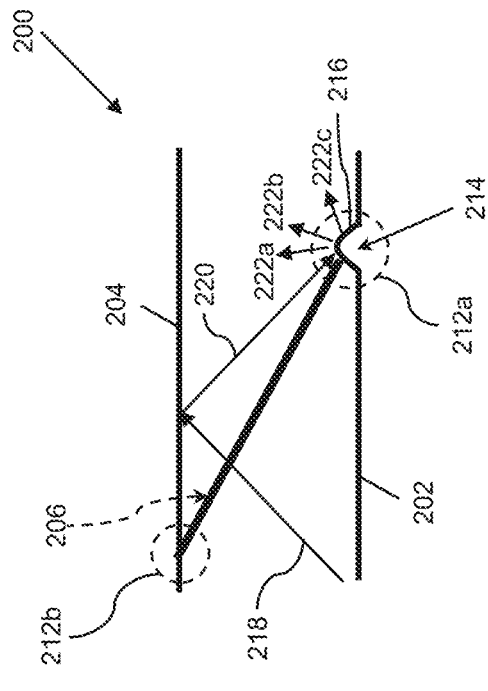
FIG. 17
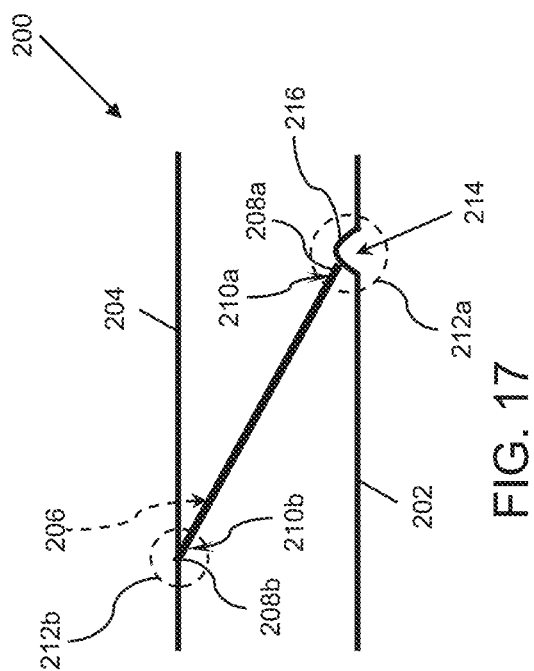
FIG. 18
FIG. 19

"LIGHT-GUIDE OPTICAL ELEMENT EMPLOYING COMPLEMENTARY COATED PARTIAL REFLECTORS, AND LIGHT-GUIDE OPTICAL ELEMENT HAVING REDUCED LIGHT SCATTERING"

CROSS-REFERENCE TO RELATED APPLICATIONS

This application claims priority from U.S. Provisional Patent Application No. 62/943,867, filed Dec. 5, 2019, whose disclosure is incorporated by reference in its entirety herein.

TECHNICAL FIELD

The present invention relates to display systems and in particular light-guide optical elements suitable for use in a display.

BACKGROUND OF THE INVENTION

Certain display technologies, particularly suitable for head-up displays (HUDs) such as near-eye displays (NEDs) for virtual reality and augmented reality applications, employ a light-guide optical element, also referred to as an "optical waveguide" or a "light-transmitting substrate", with a series of internal oblique mutually parallel partially reflective surfaces. An image projector is optically coupled to the waveguide and injects light corresponding to a collimated image into the waveguide so as to propagate through the waveguide by internal reflection. The propagating light is progressively coupled out of the waveguide towards an observer's eye by reflection at the series of partially reflective surface, thereby expanding the effective optical aperture opposite the eye compared to the output aperture of the image projector.

Reflectivity of the partially reflective surfaces is sensitive to various parameters of the incident light, including the spectral range, polarization direction, and angle of incidence. The partially reflective surfaces are typically coated with optical coatings to generate a desired reflectivity pattern.

SUMMARY OF THE INVENTION

The present invention is a light-guide optical element.

Certain preferred embodiments according to one aspect of the present invention provide a light-guide optical element having internal partial reflectors coated according to an optical coating scheme that enables simultaneous satisfying of spectral, polarization and angular uniformity requirements. In other embodiments of this aspect of the present invention, the aforementioned requirements are satisfied while simultaneously minimizing reflections in undesired directions. Certain preferred embodiments according to another aspect of the present invention provide a light-guide optical element having an amount of a reflection suppressing material applied to one or more regions of an external surface or surfaces of the light-guide optical element, that reduces light scattering within the light-guide optical element.

According to the teachings of an embodiment of the present invention, there is provided an optical device. The optical device comprises: a light-transmitting substrate having at least two parallel major external surfaces for guiding light indicative of a collimated image by internal reflection at the major external surfaces; a first set of mutually parallel internal surfaces deployed within the substrate oblique to the external surfaces; and a second set of mutually parallel internal surfaces deployed within the substrate parallel to, interleaved with and in overlapping relation with, the first set of internal surfaces, at least part of each of the internal surfaces of the first set including a first coating having a first reflection characteristic so as to be at least partially reflective to at least a first subset of components of incident light, and at least part of each of the internal surfaces of the second set including a second coating having a second reflection characteristic, that is complementary to the first reflection characteristic, so as to be at least partially reflective to at least a second subset of components of incident light, such that the sets of internal surfaces cooperate to reflect all components of light from the first and second subsets.

Optionally, the first subset of components includes light corresponding to a first color, and the second subset of components includes light corresponding to a second color.

Optionally, the first subset of components includes light having a first polarization direction, and the second subset of components includes light having a second polarization direction.

Optionally, at least one of the first or second coatings includes a structural polarizer.

Optionally, at least one of the first or second coatings includes a dielectric coating.

Optionally, at least one of the first or second coatings includes a metallic coating.

Optionally, the first coating is configured to: reflect light having wavelengths corresponding to a first color with a first reflection efficiency, reflect light having wavelengths corresponding to a second color with a second reflection efficiency, and reflect light having wavelengths corresponding to a third color with a third reflection efficiency less than the first reflection efficiency, and the second coating is configured to reflect light having wavelengths corresponding to the first color with a reflection efficiency that is greater than the third reflection efficiency, such that the combined reflection efficiency of the third color by the first and second coatings is greater than or equal to the first reflection efficiency.

Optionally, the second reflection efficiency is less than the first reflection efficiency, and the second coating is configured to reflect light having wavelengths corresponding to the second color with a reflection efficiency that is greater than the second reflection efficiency, such that the combined reflection efficiency of the second color by the first and second coatings is greater than or equal to the first reflection efficiency.

Optionally, the second coating is configured to reflect light having wavelengths corresponding to the first color with a reflection efficiency that is approximately equal to the first reflection efficiency.

Optionally, the first coating is configured to: reflect light having wavelengths corresponding to a first color with a first reflection efficiency, reflect light having wavelengths corresponding to a second color with a second reflection efficiency less than the first reflection efficiency, and reflect light having wavelengths corresponding to a third color with a third reflection efficiency less than the first reflection efficiency, and the second coating is configured to: reflect light having wavelengths corresponding to the first color at a reflection efficiency greater than the second and third reflection efficiencies, reflect light having wavelengths corresponding to the second color at a reflection efficiency greater than the second and third reflection efficiencies, and reflect light having wavelengths corresponding to the third color at a reflection efficiency greater than the second and third reflection efficiencies.

Optionally, the first coating includes a patterned coating comprising a number of portions of a reflective material arranged on each of the internal surfaces of the first set in a prescribed pattern.

Optionally, each portion of the reflective material has a circular shape in a plane of the internal surfaces.

Optionally, each portion of the reflective material has an oblong shape in a plane of the internal surfaces.

Optionally, the reflective material is a dielectric material.

Optionally, the reflective material is a metallic material.

Optionally, spaces formed between the portions of the reflective material are transparent.

Optionally, a second reflective material is deployed on the internal surfaces in spaces formed between the portions of the reflective material.

Optionally, the second reflective material includes a dielectric material.

Optionally, the second reflective material is arranged on the internal surfaces in a prescribed pattern.

Optionally, at least one of the number of portions or a size of the portions on the internal surfaces of the first set increases with respect to a primary direction of propagation of light through the substrate.

Optionally, the optical device further comprises an amount of a light reflection suppressing material deployed between the reflective material and at least part of the internal surfaces of the first set.

Optionally, the light reflection suppressing material includes a light absorbing material.

Optionally, the light reflection suppressing material includes a light scattering material.

Optionally, the first coating is deployed on a first portion of each of the internal surfaces of the first set, and the second coating is deployed on a second portion of each of the internal surfaces of the first set, and the second coating is deployed on a first portion of each of the internal surfaces of the second set, and the first coating is deployed on a second portion of each of the internal surfaces of the second set, and the first and second portions of the internal surfaces of the first set are non-overlapping portions, and the first and second portions of the internal surfaces of the second set are non-overlapping portions.

Optionally, the internal surfaces of the first and second sets reflect a proportion of light, guided by internal reflection at the major external surfaces, out of the substrate toward an eye of a viewer.

Optionally, the internal surfaces of the first and second sets reflect a proportion of light, guided by internal reflection at the major external surfaces, out of the substrate so as to be coupled into a second light-transmitting substrate for guiding by internal reflection at external surfaces of the second light-transmitting substrate.

Optionally, the substrate is configured to guide light in one dimension through the substrate.

Optionally, the substrate is configured to guide light in two dimensions through the substrate.

Optionally, at least one of the internal surfaces from at least one of the first or second sets includes an end region associated with a first of the external surfaces of the substrate defining an interface region between the at least one internal surface and the substrate, and the first of the external surfaces has an amount of light absorbing material located in an indentation formed in the first of the external surfaces at the interface region.

There is also provided according to an embodiment of the teachings of the present invention an optical device. The optical device comprises: a light-transmitting substrate having at least two parallel major external surfaces for guiding light indicative of a collimated image by internal reflection at the major external surfaces; and a plurality of mutually parallel internal surfaces deployed within the substrate oblique to the external surfaces, at least part of a first subset of the internal surfaces comprising a patterned coating that includes a number of portions of a reflective material arranged on the internal surfaces of the first subset in a prescribed pattern, the patterned coating being at least partially reflective to at least a first subset of components of incident light, a second subset of the internal surfaces being at least partially reflective to at least a second subset of components of incident light, and the internal surfaces of the first subset being in overlapping relation with the internal surfaces of the second subset such that the subsets of internal surfaces cooperate to reflect all components of light from the first and second subsets.

Optionally, each portion of the reflective material has a circular shape in a plane of the internal surfaces of the first subset.

Optionally, each portion of the reflective material has an oblong shape in a plane of the internal surfaces of the first subset.

Optionally, the reflective material is a dielectric material.

Optionally, the reflective material is a metallic material.

Optionally, spaces formed between the portions of the reflective material are transparent.

Optionally, a second reflective material is deployed in spaces formed between the portions of the reflective material.

Optionally, the second reflective material includes a dielectric material.

Optionally, the second reflective material is arranged on the internal surfaces of the first subset in a prescribed pattern.

Optionally, at least one of the number of portions or a size of the portions on the internal surfaces of the first subset increases with respect to a direction of propagation of light through the substrate.

Optionally, the optical device further comprises an amount of a light reflection suppressing material deployed between the reflective material and the internal surfaces of the first subset.

Optionally, the light reflection suppressing material includes a light absorbing material.

Optionally, the light reflection suppressing material includes a light scattering material.

Optionally, the internal surfaces of the first subset are interleaved with the internal surfaces of the second subset.

Optionally, surfaces of the first subset of internal surfaces are coplanar with surfaces of the second subset of internal surfaces.

Optionally, the internal surfaces reflect a proportion of light, guided by internal reflection at the major external surfaces, out of the light-transmitting substrate toward an eye of a viewer.

Optionally, the internal surfaces reflect a proportion of light, guided by internal reflection at the major external surfaces, out of the light-transmitting substrate so as to be coupled into a second light-transmitting substrate for guiding by internal reflection at external surfaces of the second light-transmitting substrate.

Optionally, the substrate is configured to guide light in one dimension through the substrate.

Optionally, the substrate is configured to guide light in two dimensions through the substrate.

Optionally, at least one of the internal surfaces includes an end region associated with a first of the external surfaces of the substrate defining an interface region between the at least one internal surface and the substrate, and the first of the external surfaces has an amount of light absorbing material located in an indentation formed in the first of the external surfaces at the interface region.

There is also provided according to an embodiment of the teachings of the present invention an optical device. The optical device comprises: a light-transmitting substrate having at least two parallel major external surfaces for guiding light by internal reflection at the major external surfaces; at least one at least internal surface deployed within the substrate oblique to the external surfaces, the internal surface having an end region associated with a first of the external surfaces of the substrate defining an interface region between the internal surface and the substrate; and an amount of a light absorbing material located in an indentation formed in the first of the external surfaces at the interface region.

Optionally, the at least one internal surface includes a plurality of mutually parallel partially reflective surfaces.

Optionally, the at least one internal surface is configured to couple light, guided within the substrate by internal reflection, out of the substrate.

Optionally, the at least one internal surface is configured to couple light into the substrate so as to propagate within the substrate by internal reflection.

Optionally, the at least one internal surface is configured to couple light, guided within the substrate by internal reflection, into a second light-transmitting substrate so as to propagate within the second substrate by internal reflection.

Optionally, the light absorbing material includes black absorbing paint.

Optionally, the amount of light absorbing material is sufficient to fill the indentation.

Optionally, the internal surface has a second end region associated with a second of the external surfaces of the substrate defining a second interface region between the internal surface and the substrate, and the optical device further comprises: an amount of a light absorbing material located in an indentation formed in the second of the external surfaces at the second interface region.

There is also provided according to an embodiment of the teachings of the present invention method of fabricating an optical device. The method comprises: obtaining a light-transmitting substrate having at least two parallel major external surfaces for guiding light by internal reflection at the major external surfaces, the substrate having at least one at least internal surface deployed between the external surfaces and oblique to the external surfaces, the internal surface having an end region associated with a first of the external surfaces of the substrate to define an interface region between the internal surface and the first of the external surfaces; and depositing an amount of a light absorbing material in an indentation formed in the first of the external surfaces at the interface region.

Optionally, the depositing the amount of the light absorbing material includes applying the light absorbing material to substantially the entirety of the first of the external surfaces.

Optionally, the method further comprises: polishing the first of the external surfaces to remove the light absorbing material from substantially all portions of the first of the external surfaces that are outside of the indentation.

Optionally, the obtaining the light-transmitting substrate includes: attaching together a set of coated transparent plates to form a stack, slicing the stack diagonally to form the substrate having the at least two parallel major external surfaces and the internal surface oblique to the external surfaces, and polishing the external surfaces.

Optionally, the polishing the external surfaces causes the indentation to form in the first of the external surfaces at the interface region.

Optionally, the amount of the light absorbing material is sufficient to fill the indentation.

Optionally, the internal surface has a second end region associated with a second of the external surfaces of the substrate to define an interface region between the internal surface and the second of the external surfaces, and the method further comprises: depositing an amount of a light absorbing material in an indentation formed in the second of the external surfaces at the interface region between the internal surface and the second of the external surfaces.

There is also provided according to an embodiment of the teachings of the present invention an optical device. The optical device comprises: a light-transmitting substrate having first and second pairs of parallel major external surfaces forming a rectangular cross-section, the substrate configured for guiding light by internal reflection at the major external surfaces; at least one internal surface deployed within the substrate oblique to a direction of elongation of the substrate configured to couple light out of the substrate; and an amount of a light absorbing material located at a blemish formed at an external region of the substrate.

Optionally, the blemish includes a scratch formed in one of the external surfaces.

Optionally, the blemish includes a chip in an edge formed between one of the external surfaces of the first pair of external surfaces and one of the external surfaces of the second pair of external surfaces.

Optionally, the blemish includes a chip in a corner formed between one of the external surfaces of the first pair of external surfaces and one of the external surfaces of the second pair of external surfaces.

Optionally, the internal surface includes at least a first end region associated with one of the external surfaces of the substrate so as to define an interface region between the internal surface and the substrate.

Optionally, the blemish includes an indentation formed at the interface region.

Optionally, the light absorbing material includes black absorbing paint.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 3 is a schematic representation of image illumination components reflected by the internal partially reflective surfaces at different reflected angles;

FIG. 4 is a schematic representation of a patterned reflective coating having portions of reflective material that can be used to compensate for lower reflection of some of the illumination components;

FIG. 5 is a schematic representation of a patterned reflective coating similar to FIG. 4, but having portions of reflective material in a different shape than the shape of portions of reflective material in FIG. 4;

FIG. 6 is a schematic representation of a coating having two reflective patterns on a single coating;

FIG. 17 is a schematic representation of a section of a light-guide optical element (LOE) showing an internal partially reflective surface and a blemish in the form of an indentation formed at an interface region between the internal partially reflective surface and an external face of the LOE;

FIG. 18 is a schematic representation corresponding to FIG. 17, illustrating the progression of image illumination through the LOE and the scattering effects on the image illumination imparted by the indentation;

FIG. 19 is a schematic representation of a section of a light-guide optical element (LOE) constructed and operative according to the teachings of an aspect of the present invention, similar to the LOE of FIGS. 17 and 18, but having an amount of light absorbing material applied at the indentation, and illustrating the absorption of image illumination by the light absorbing material;

DESCRIPTION OF THE PREFERRED EMBODIMENTS

Figure 1:
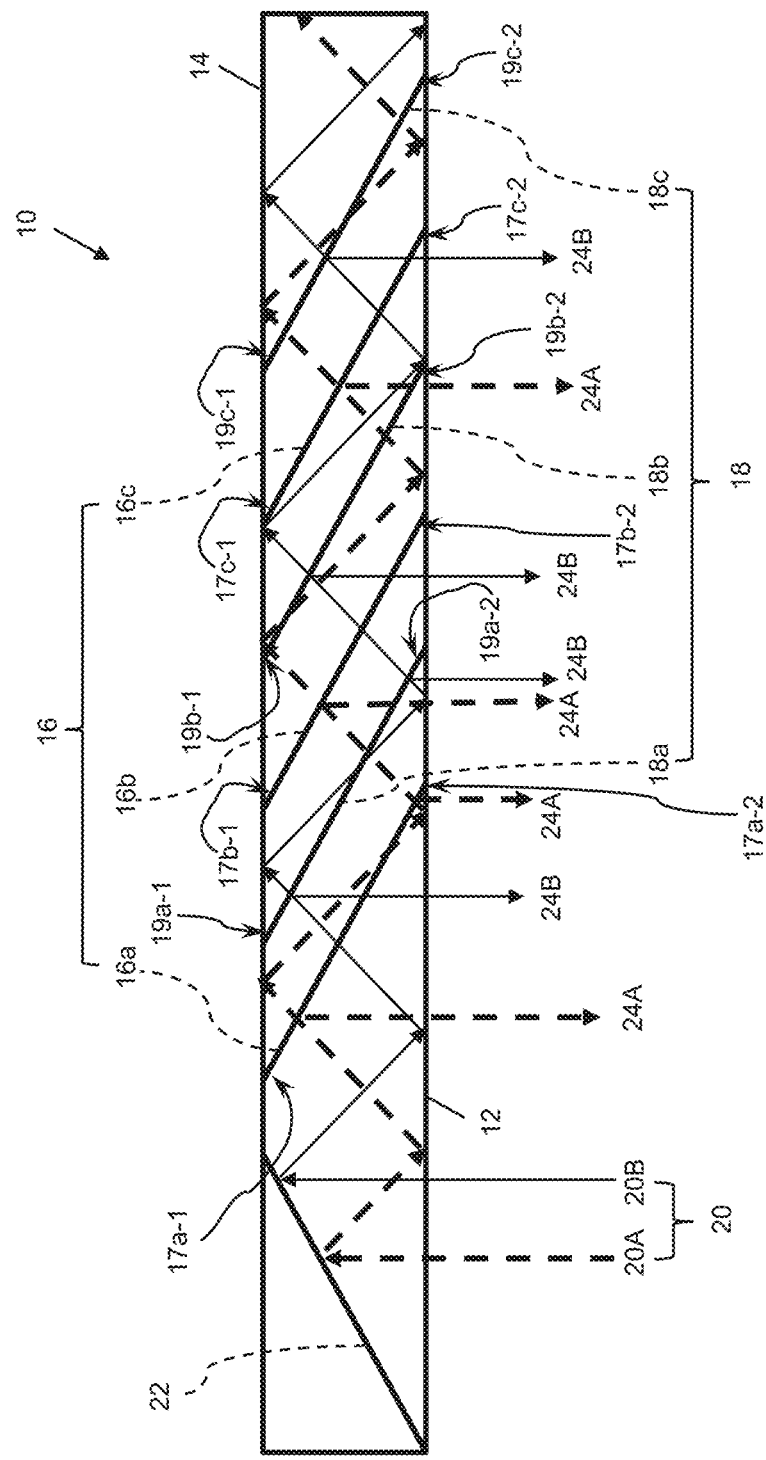
FIG. 1 is a schematic side view representation of a light-guide optical element (LOE), constructed and operative according to the teachings of an aspect of the present invention, illustrating the progression of components of image illumination passing through a sequence of interleaved sets of internal partially reflective surfaces having complementary sets of coatings.

Embodiments of the present invention provide various light-guide optical elements with internal partial reflectors, including light-guide optical elements in which the internal partial reflectors have coatings applied according to a complementary coating scheme, and light-guide optical elements having reflection suppressing material applied to one or more regions of an external surface or surfaces of the light-guide optical element.

The principles and operation of the various light-guide optical elements according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, front and back, upper and lower, left and right, and the like. These directional references are exemplary only to illustrate the invention and embodiments thereof.

Referring now to the drawings, FIG. 1 illustrates an optical device in the form of a light-guide optical element (LOE), generally designated 10, constructed and operative according to a non-limiting embodiment of the present invention. The LOE 10 is formed as a light-transmitting substrate, constructed from a transparent material (such as glass), that has a pair of parallel faces (also referred to as "major external surfaces" or "surfaces") 12, 14, and a plurality of planar partially reflective surfaces 16a, 16b, 16c, 18a, 18b, 18c deployed within the substrate at an oblique angle to the parallel faces 12, 14. In the non-limiting illustrated embodiment, the LOE 10 forms a slab-type waveguide, i.e., where the other two dimensions of the LOE 10 are at least an order of magnitude greater than the distance between the parallel faces 12, 14. The partially reflective surfaces (referred to hereinafter interchangeably as "internal surfaces", "internal partial reflectors", "partial reflectors" or "facets") 16a, 16b, 16c, 18a, 18b, 18c are subdivided into two sets of internals surfaces, namely a first set 16 having the internal surfaces 16a, 16b, 16c, and a second set 18 having the internal surfaces 18a, 18b, 18c. For simplicity of presentation each of the sets 16, 18 is illustrated here as having three internal surfaces, however it should be understood that either or both of the sets could have any suitable number of internal surfaces.

In certain preferred but non-limiting embodiments, the internal surfaces of the two sets 16, 18 are interleaved, such that one or more of the internal surfaces 16a, 16b, 16c is positioned between a pair of adjacent internal surfaces 16a, 16b, 16c, 18a, 18b, 18c, and vice versa.

Preferably, the internal surfaces alternate between the internal surfaces of the two sets 16, 18, such that for each pair of adjacent internal surfaces 16a, 16b, 16c there is a single one of the internal surfaces 18a, 18b, 18c, and vice versa. This alternating configuration is illustrated in FIG. 1.

A projected image 20, represented here schematically by a beam of illumination 20 including sample light rays 20A and 20B, is coupled into the LOE 10 (i.e., into the substrate) by an optical coupling-in configuration 22, represented schematically as a coupling-in reflector. Other suitable coupling-in configurations for coupling image illumination into the LOE 10, such as by use of a suitably angled coupling prism or a diffractive optical element, are well-known in the art. The image illumination 20 is guided within the LOE 10 by repeated internal reflection at the parallel faces 12, 14 (i.e., the image illumination 20 is trapped by internal reflection within the LOE substrate). In certain preferred but non-limiting implementations, the propagation through the LOE 10 by internal reflection is in the form of total internal reflection (TIR), whereby incidence of the propagating image illumination 20 at the parallel faces 12, 14 at angles greater than a critical angle causes reflection of the illumination at the parallel faces 12, 14. In other non-limiting implementations, the propagation through the LOE 10 by internal reflection is effectuated by a reflective coating (e.g., an angularly selective reflective coating) applied to the parallel faces 12, 14.

The image illumination 20 propagates through the LOE 10 until reaching the series of internal surfaces 16a, 16b, 16c, 18a, 18b, 18c, where part of the image intensity is reflected out of the LOE 10 as light rays 24A, 24B. In certain embodiments, such as the embodiment illustrated in FIG. 1, the internal surfaces 16a, 16b, 16c, 18a, 18b, 18c reflect the image illumination as reflected light rays 24A, 24B so as to coupled part of the image intensity out of the LOE 10 toward the eye of an observer. As will be discussed, in other embodiments the internal surfaces 16a, 16b, 16c, 18a, 18b, 18c reflect the image illumination as reflected light rays 24A, 24B so as to be coupled into another LOE for guiding between parallel faces of the other LOE and for coupling out toward the observer's eye by a set of internal surfaces deployed within the other LOE.

The image illumination 20 typically includes multiple components of illumination, including, for example, different polarization components and different color (i.e., spectral) components. The internal surfaces 16a, 16b, 16c, 18a, 18b, 18c are preferably formed from transparent plates or slabs having coatings applied to at least part of the sides or surfaces of the plates or slabs. The coatings are designed with reflective characteristics such that the coatings are at least partially reflective to incident light having particularly corresponding characteristics in order to generate a desired reflectivity pattern for the components of the illumination, the details of which will be described in detail below. In general, at least part of the internal surfaces 16a, 16b, 16c have a coating with a reflectivity characteristic such that certain components of the image illumination are reflected by the internal surfaces 16a, 16b, 16c. At least part of the internal surfaces 18a, 18b, 18c also have a coating with a reflectivity characteristic that is complementary to the reflection characteristic of the internal surfaces 16a, 16b, 16c, such that components of the image illumination that are not sufficiently reflected by the internal surfaces 16a, 16b, 16c are suitably and sufficiently reflected by the internal surfaces 18a, 18b, 18c.

Before explaining the details of the design of the reflectors 16a, 16b, 16c, 18a, 18b, 18c in further detail, it is noted that the projected image illumination 20 is a collimated image, i.e., where each pixel is represented by a beam of parallel rays at a corresponding angle, equivalent to light from a distant scene far from the observer (the collimated image may be referred to as being "collimated to infinity"). Although the image 20 is represented here simplistically as a single ray corresponding to a single point of the image, typically the centroid of the image, it is noted that the image in fact includes a range of angles to each side of the central ray, which are coupled into the substrate with a corresponding range of angles, and are similarly coupled out of the substrate at corresponding angles thereby creating a field of view corresponding to parts of the image arriving in directions to the eye of the observer.

Each internal surface has opposing ends that define where the internal surface respectively starts and stops. These opposing ends are referred to as a "starting end" and a "stopping end". Looking at the internal surfaces 16a and 18a, for example, it can be seen that the internal surface 16a has a starting end 17a-1 and a stopping end 17a-2, and the internal surface 18a has a starting end 19a-1 and a stopping end 19a-2. The internal surfaces 16a, 16b, 16c are preferably deployed within the LOE 10 such that each of the internal surfaces 16b, 16c starts where the previous internal surfaces 16a, 16b ends in a projection plane of the internal surfaces. In other words, the starting end 17b-1 of the internal surface 16b is aligned with the stopping end 17a-2 of the internal surface 16a, and the starting end 17c-1 of the internal surface 16c is aligned with the stopping end 17b-2 of the internal surface 16b. In such a deployment, the facets 16a, 16b, 16c appear as continuous and non-overlapping in the projection plane, which in the non-limiting implementation illustrated in FIG. 1 is a plane that is parallel to the planes of the surfaces 12, 14. This deployment ensures that there are no gaps between adjacent internal surfaces 16a, 16b, 16c in the primary light propagation direction through the LOE 10 (arbitrarily illustrated as being from left to right along the horizontal axis in FIG. 1), thereby preserving continuous aperture expansion (i.e., aperture multiplication) for the components of light reflected by the first set 16. Similarly, the internal surfaces 18a, 18b, 18c are preferably deployed within the LOE 10 such that each of the internal surfaces 18b, 18c starts where the previous internal surfaces 18a, 18b ends, thereby preserving continuous aperture expansion for the components of light reflected by the second set 18. In other words, the starting end 19b-1 of the internal surface 18b is aligned with the stopping end 19a-2 of the internal surface 18a, and the starting end 19c-1 of the internal surface 18c is aligned with the stopping end 19b-2 of the internal surface 18b.

In embodiments in which the internal surfaces of the two sets 16, 18 are interleaved, it is preferable that the two sets 16, 18 are also in overlapping relation whereby at least some of the internal surfaces of the first set 16 overlap with some of the internal surfaces of the second set 18, and vice versa. In certain cases, the overlapping relation is such that there is at least one internal surface of one of the sets 16, 18 that has its starting end located at a position in the projection plane that is between the starting and stopping ends of a single internal surface of the other of the sets 16, 18, and such that the stopping end of the internal surface of the one of the sets 16, 18 is located at a position in the projection plane that is between the starting and stopping ends of another single internal surface of the other of the sets 16, 18.

FIG. 1 shows the two sets 16, 18 in an interleaved and overlapping configuration in which the starting end 19a-1 of the internal surface 18a is located at a position in the projection plane that is between the starting end 17a-1 and the stopping end 17a-2 of the internal surface 16a, the stopping end 19a-2 of the internal surface 18a is located at a position in the projection plane that is between the starting end 17b-1 and the stopping end 17b-2 of the internal surface 16b, the starting end 19b-1 of the internal surface 18b is located at a position in the projection plane that is between the starting end 17b-1 and the stopping end 17b-2 of the internal surface 16b, the stopping end 19b-2 of the internal surface 18b is located at a position in the projection plane that is between the starting end 17c-1 and the stopping end 17c-2 of the internal surface 16b, and the starting end 19c-1 of the internal surface 18c is located at a position in the projection plane that is between the starting end 17c-1 and the stopping end 17c-2. Likewise, the stopping end 17a-2 of the internal surface 16a is located at a position in the projection plane that is between the starting end 19a-1 and the stopping end 19a-2 of the internal surface 18a, the starting end 17b-1 of the internal surface 16b is located at a position in the projection plane that is between the starting end 19a-1 and the stopping end 19a-2 of the internal surface 18a, the stopping end 17b-2 of the internal surface 16b is located at a position in the projection plane that is between the starting end 19b-1 and the stopping end 19b-2 of the internal surface 18b, the starting end 17c-1 of the internal surface 16c is located at a position in the projection plane that is between the starting end 19b-1 and the stopping end 19b-2 of the internal surface 18b, and the stopping end 17c-2 of the internal surface 16c is located at a position in the projection plane that is between the starting end 19c-1 and the stopping end 19c-2 of the internal surface 18c.

Preferably the overlapping configuration between the internal surfaces of the two sets 16, 18 is such that the starting/stopping end of an internal surface of one of the sets 16, 18 is at the midpoint between the starting and stopping ends of the internal surface of the other of the sets 16, 18. It should be noted that in certain instances "overlapping relation" may include configurations in which an internal surface of the set 16 and an internal surface of the set 18 are entirely overlapping such that they are coplanar, whereby the starting and stopping ends of a facet of the set 16 are respectively coincident with the starting and stopping ends of a facet of the set 18. Further details of optical waveguides that employ overlapping internal surface having conventional coating architectures can be found in the applicant's commonly owned U.S. Pat. No. 10,481,319, which is incorporated by reference in its entirety herein.

The following paragraphs describe the coating designs for the sets 16, 18 of internal surfaces according to embodiments of the present invention. The internal surfaces 16a, 16b, 16c, 18a, 18b, 18c have coatings with complementary reflectivity characteristics such that components of the image illumination that are not sufficiently reflected by one of the internal surfaces 16a, 16b, 16c are suitably and sufficiently reflected by the one of the internal surfaces 18a, 18b, 18c. In particular, and as will be described in detail below, the internal surfaces 16a, 16b, 16c have coatings configured to reflect a proportion of intensity for each illumination component in a subset of the components of the image illumination, and the internal surfaces 18a, 18b, 18c have coatings configured to reflect a proportion of intensity for each illumination component in another subset of the components of the image illumination, such that the coatings of the two sets 16, 18 of internal surfaces cooperate to reflect a combined proportion of intensity of all illumination components in the two subsets. The combined proportion of intensity cooperatively reflected by the coatings of the two sets 16, 18 is greater than or equal to the proportion of intensity reflected individually by the coatings of the two sets 16, 18.

When the internal surfaces are interleaved according to the alternating configuration as illustrated in FIG. 1, the complementary coatings of pairs of adjacent internal surfaces from two different sets enable the internal surfaces from the two sets to cooperate to reflect all of the components of the image illumination across portions of the projection plane of the internal surfaces so as to preserve continuous aperture expansion.

As part of a first non-limiting example, image illumination 20 that includes different spectral components of illumination, for example spectral components corresponding to red light, green light, and blue light, is considered. In this example, the internal surfaces 16a, 16b, 16c may include a first coating that is configured to reflect red light (i.e., light having wavelengths near 638 nm) with high efficiency and to partially reflect green light (i.e., light having wavelengths near 532 nm) with moderate efficiency, but is configured to partially reflect blue light (i.e., light having wavelengths near 456 nm) with low efficiency. In order to compensate for the moderate reflection efficiency of green light and the low reflection efficiency of blue light imparted by the internal surfaces 16a, 16b, 16c, the internal surfaces 18a, 18b, 18c can include a second coating that is configured to reflect blue light with high efficiency (on par with the efficiency imparted by the internal surfaces 16a, 16b, 16c on red light) and to partially reflect green light with moderate efficiency (on par with the efficiency imparted by the internal surfaces 16a, 16b, 16c on green light). The coating of the internal surfaces 18a, 18b, 18c may also partially reflect red light with low efficiency. As a result, the light rays 24A convey high efficiency red light, moderate efficiency green light, and low efficiency blue light, and the light rays 24B convey high efficiency blue light and moderate efficiency green light, such that the overall reflected image resultant from the reflection by the two interleaved and overlapping sets 16, 18 has little to no color difference across the three colors while preserving continuous aperture expansion (due to the interleaving of the internal surfaces). Any residual color difference that cannot be eliminated by the coatings of the two sets 16, 18 can be compensated for by adjustment of colored light sources that are used for generating the collimated image illumination 20.

In another non-limiting example, image illumination 20 that includes two orthogonal linear polarization components, namely s-polarization and p-polarization components, is considered. Here, the two sets 16, 18 of internal surfaces include coatings that are selectively reflective to the orthogonal polarizations in a complementary fashion, whereby the internal surfaces of one of the sets 16 primarily reflect light that is polarized in one of the polarization directions (e.g., p-polarization) with respect to the surface of the internal surfaces of the set 16, and the internal surfaces of the other set 18 primarily reflect light that is polarized in the orthogonal polarization direction (e.g., s-polarization) with respect to the surface of the internal surfaces of the set 18.

Figure 2:
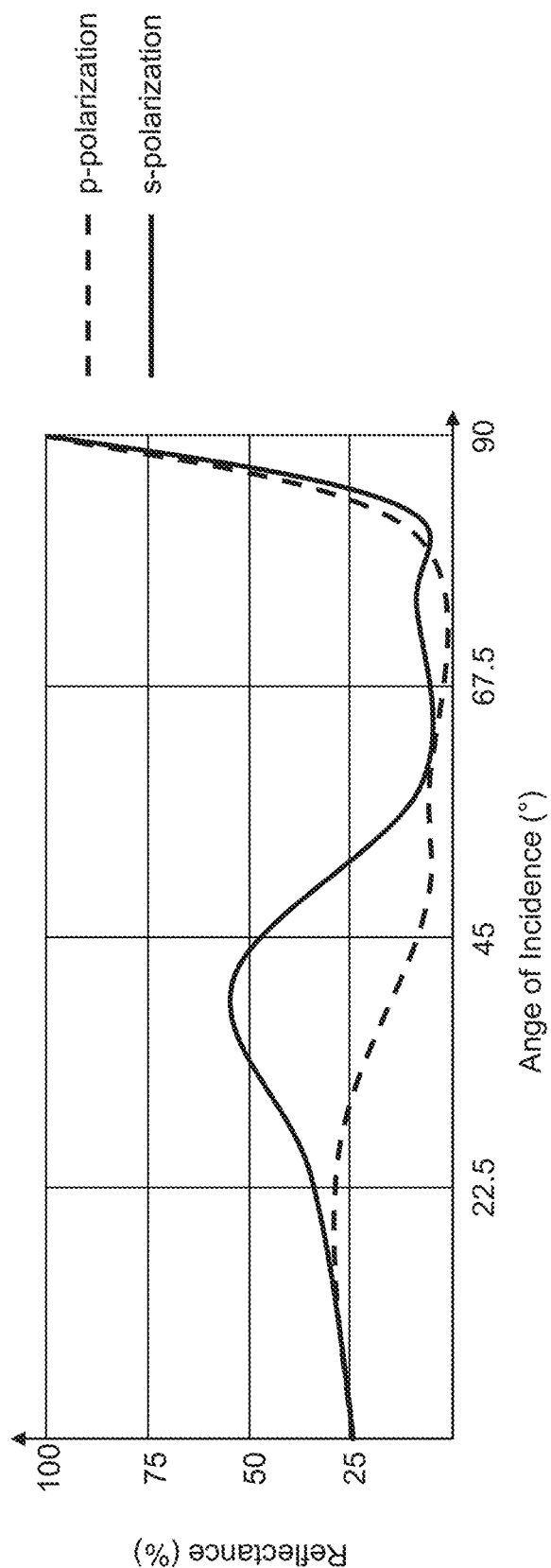
FIG. 2 illustrates reflectance curves, as a function of angle of incidence for p-polarization and s-polarization, of a coating that can be used in some of the internal partially reflective surfaces.

One type of coating that can provide such polarization selective reflectivity is a dielectric coating. FIG. 2 shows the reflectivity characteristics of such a dielectric coating for p-polarization and s-polarization across angle of incidence (AOI). As can be seen, at a lower range of AOIs, for example AOIs in the range of 0-20 degrees (i.e., close to perpendicular the internal surfaces), both s and p-polarizations are reflected with approximately the same efficiency, i.e., the reflectance of s and p-polarizations is approximately the same (slightly above 25%). As the AOI increases over a given range, the reflectance of the two polarizations deviates. Specifically, at a higher range of AOIs, for example AOIs in the range of 20-55 degrees, the reflectance for p-polarization is reduced relative to the reflectance for s-polarization. For example, at AOI of approximately 40 degrees, the reflectance for s-polarization is slightly above 50% (thereby operating as an almost perfect partial reflector), whereas the reflectance for p-polarization is below 15%.

In order to generate an image having wide field of view for the observer, different angles are reflected from different internal surfaces. FIG. 3 shows the LOE 10 in which all of the internal surfaces 16a, 16b, 16c, 18a, 18b, 18c include the dielectric coating having the reflectance characteristics described above with reference to FIG. 2. In this configuration, the image illumination that propagates through the LOE has both s-polarization and p-polarization components. By way of illustration, some of image illumination that propagates through the LOE 10 impinges on the internal surface 18c at an AOI in the lower range such that the dielectric coating reflects both polarizations with approximately the same efficiency. As a result, the polarization components of the reflected light ray $R_{18c}$ are of approximately equal intensity. However, some of the image illumination impinges on the internal surfaces 18a, 18b, 16b at AOIs in the higher range, such that the dielectric coating of the internal surfaces 18a, 18b, 16b primarily reflects the s-polarized light. As a result, the s-polarization component of each of the reflected light rays $R_{18a}$, $R_{18b}$, $R_{16b}$ is the dominant component. In order to compensate for the reduced p-polarization component at the particular AOI range, the internal surfaces 18a, 18b are re-designed so as to reflect primarily p-polarized light (or to reflect both polarizations with approximately equal efficiency).

According to certain embodiments, in order to achieve the desired reflectivity for p-polarized light, the internal surfaces 18a, 18b additionally include an orientation sensitive polarization reflector (or "structural polarizer") that transmits one incident polarization and reflects the orthogonal polarization according to the reflector's inherent axis orientation. One non-limiting example of a structural polarizer is a birefringent dielectric coating or film commercially available from the 3M Company of Minnesota, USA. Another non-limiting example of a structural polarizer is a wire-grid film, for example commercially available from Moxtek Inc. of Utah, USA. Yet another non-limiting example of a structural polarizer is a patterned partially reflective coating having a number of portions of reflective material deployed in a pattern on a thin film or transparent substrate.

With continued reference to FIGS. 1-3, refer now to FIG. 4, which shows an illustration of a non-limiting example of a patterned reflective coating (also referred to as a "reflective pattern coating") 30 according to non-limiting embodiments of the present invention. The coating 30 has reflective characteristics such that light that is polarized in one polarization direction (e.g., s-polarized or p-polarized) is primarily/majority reflected by the coating 30, and light that is polarized in the orthogonal polarization direction (e.g., p-polarized or s-polarized) is primarily/majority transmitted by the coating 30. Preferably, the reflected polarization exhibits more than 90% reflection (referred to as "substantially completely reflective"), and most preferably over 95% reflection. Conversely, the transmitted polarization preferably exhibits more than 90% transmission (referred to as "substantially completely transmissive"), and most preferably over 95% transmission.

The coating 30 includes an amount 34 of reflective material (referred to hereinafter as "portions" 34) deployed in spaced relation and arranged in a prescribed pattern on a planar base surface 32. The base surface 32 is preferably, but not necessarily, transparent to light such that the spaces 35 on the base surface 32 that are formed between and around the portions 34 of reflective material are light-transparent. In certain embodiments, the planar base surface 32 is a thin-film or thin-substrate that can be bonded to a transparent plate to form the internal partially reflective surface. In other embodiments, the planar base surface 32 is itself the transparent plate from which the facet is formed, and the portions 34 of reflective material are deposited directly on the transparent plate. In certain embodiments, the reflective material is a dielectric material. In other sometimes more preferred embodiments, the reflective material is a metallic material, such as silver. Each portion 34 of the reflective material has a shape that enables light in one polarization direction to induce flow of electrical current. Therefore, light that is polarized in the polarization direction that induces current flow sees the coating 30 as a reflector when incident to the coating 30, whereas light that is polarized in the orthogonal polarization direction sees the coating 30 as light-transmissive when incident to the coating 30.

In the non-limiting example illustrated in FIG. 4, each of the portions 34 is identical in size and each has a generally circular shape in the plane of the base surface 32 (i.e., in the plane of the internal surface). Here, the portions 34 are effectively circularly symmetric (in the plane of the base surface 32) dots of reflective material deposited on the base surface 32 in the arranged pattern. In this configuration, the portions 34 are arranged in a prescribed pattern so as to be uniformly spaced such that the distance between the centers of each pair of adjacent dots is constant across the entire coating 30.

FIG. 5 shows another non-limiting example of the coating 30 in which portions 36 of reflective material having non-circular symmetry in the plane of the base surface 32 are deployed on the base surface 32 in a prescribed pattern. Here, the portions 36 have a generally elliptical or oblong shape (two orthogonal axes of symmetry) in the plane of the base surface 32 (i.e., in the plane of the internal surface). The orientations of the portions 36 in the plane of the base surface 32 determine the dominant reflective polarization. For example, in the configuration of the portions 36 illustrate in FIG. 5, the dominant reflected polarization may be p-polarization, whereas rotating the portions 36 by 90-degrees in the plane of the base surface 32 may switch the dominant reflected polarization to s-polarization. Other shapes of the reflective material besides circular and oblong shapes are contemplated herein, for example, the portions of reflective material may be deployed in a pattern of lines on the base surface 32.

By employing internal surfaces 18a, 18b that have the coating 30, the internal surfaces 18a, 18b are able to reflect the subset of the illumination components (in this case the p-polarization components) that is not fully reflected by the internal surface 16b. In other words, for a given AOI in the higher AOI range, the internal surface 16a reflects a first subset of components of the image illumination (in the form of the s-polarization components) with high reflectance and reflects a second subset of components of the image illumination (in the form of the p-polarization components) with low reflectance. For the same given AOI, the internal surfaces 18a, 18b reflect the low reflectance components, i.e., the second subset of components of the image illumination (in this case the p-polarization components) with high reflectance, so as to compensate for the low reflectance imparted by the internal surface 16b. As a result, the internal surfaces 18a, 16b, 18b cooperate to reflects both polarization components (i.e., the components from both subsets) to preserve continuity of aperture multiplication. The two subsets of components of image illumination are complementary, meaning that the union of the components from the two subsets accounts for all of the components of the propagating image illumination. In this particular example, the s and p-polarization components are complementary since they make up the polarization components of the image illumination.

In certain embodiments, two different coatings may be implemented on the same internal surface plane using a single coating. For example, a dielectric coating can be deployed in the spaces between the portions 34. As a result, the portions 34 or 36 can be implemented as one type of dielectric coating or metallic coating, and the spaces 35 on the base surface 32 that are formed between and around the portions 34 or 36 can be implemented as another type of dielectric coating. FIG. 6 schematically illustrates an example of such a coating 31, in which portions 38 of a second reflective material are deposited in a prescribed pattern in the spaces 35 on the base surface 32 formed between and around the portions 34. In the non-limiting example illustrated in FIG. 6, each of the portions 34 is generally circular in shape, whereas each of the portions 38 is generally elliptical in shape.

As discussed, the coating designs of the embodiments of the present invention are equally applicable to situations in which the image illumination includes different visible color components. In such situations, some of the principles of the patterned reflector coatings described above with reference to FIGS. 4-6 can be used to address color non-uniformity issues. For example, the internal surfaces 16a, 16b, 16c can include a coating that partially reflects a first subset of the three colors at a suitable reflection efficiency, and the internal surfaces 18a, 18b, 18c can include a coating that partially reflects a second subset of the three colors at a suitable efficiency, where the second subset of the colors includes colors that are not suitably reflected by the internal surfaces 16a, 16b, 16c. In general, the subsets of color components of image illumination are complementary, meaning that the union of the components from the subsets accounts for all of the color components of the propagating image illumination. The following paragraphs describe various examples of designs of the coatings of the internal surfaces of the two sets 16, 18 for preserving color uniformity.

By way of introduction, it would be preferable to arrange the portions 34, 36 of reflective material in a pattern that is relatively small so that the observer will perceive a uniform image. In particular, it would be preferable to deploy the portions 34, 36 of reflective material in a geometric arrangement in accordance with the size of the pupil of the eye of the observer, for example as a circle having a diameter of approximately 2 mm (the pupil of the human eye typically has a diameter in the range of 2-4 mm in bright lighting conditions). However, portions of reflective material having small size and arranged in small patterns tend to diffract incident light to large angles, thereby reducing image resolution. Therefore, in non-limiting implementations of the present invention, the internal surfaces of the two sets 16, 18 are implemented using the coatings having reflective patterns (described above with reference to FIGS. 4-6) in combination with dielectric coatings.

Figure 7:
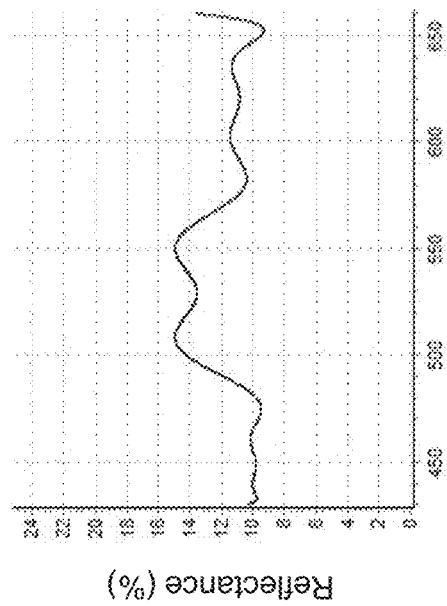
FIG. 7 illustrates reflectance curves as a function of wavelength for a coating that can be used in some of the internal partially reflective surfaces.
Figure 8:
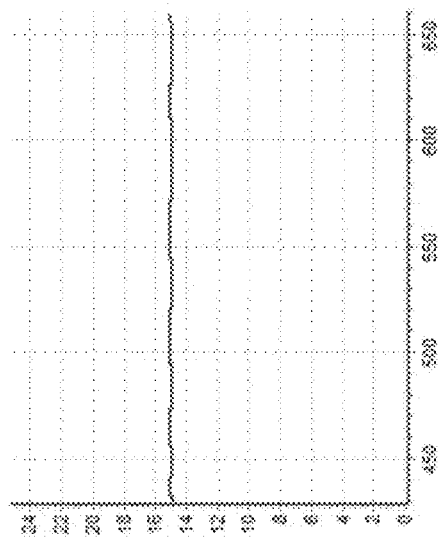
FIG. 8 illustrates reflectance curves achieved when using the coating of FIG. 7 in combination with a complementary coating used on some of the internal partially reflective surfaces.

In one non-limiting example, the internal surfaces 16a, 16b, 16c are implemented using a dielectric coating so as to be at least partially reflective to red, green and blue light, and the internal surfaces 18a, 18b, 18c are implemented using a patterned coating 30 in which the reflective material of the coating 30 is a metallic material (e.g., silver). The dielectric coating of the internal surfaces 16a, 16b, 16c has reflection characteristics according to the graph illustrated in FIG. 7. Here, the dielectric coating of the internal surfaces 16a, 16b, 16c reflects a first subset of components of the image illumination, in the form of green light (i.e., light having wavelengths near 532 nm), with reasonably high efficiency (approximately 10% reflectance), but reflects a second subset of components of the image illumination, in the form of red light and blue light (i.e., light having wavelengths near 638 nm and 456 nm, respectively), with lower efficiency than the green light reflection (approximately 4% reflectance). The coating 30 of the internal surfaces 18a, 18b, 18c has reflection characteristics so as to be reflective for both subsets of components with enough efficiency in order to compensate for the low reflectance of the second subset of components. The overall reflectance imparted by the combination of the dielectric coating of the internal surfaces 16a, 16b, 16c and the coating 30 of the internal surfaces 18a, 18b, 18c is illustrated in FIG. 8. As can be inferred, the coating 30 reflects the second subset of components of the image illumination (i.e., red light and blue light) with reflectance of at least approximately 6%, which is a higher efficiency than that imparted on the second subset of components by the dielectric coating of the internal surfaces 16a, 16b, 16c. The coating 30 also reflects the first subset of components of the image illumination (i.e., green light) with reflectance of approximately 4% reflectance. The two subsets of color components are complementary in that the union of the two subsets (first subset having high efficiency green light, second subset having high efficiency red and blue light) accounts for all three of the color components of the image illumination. As a result, the overall reflected image has a reduced color difference, albeit while having a higher resolution of the green color components than the red and blue color components. The human eye, however, is most sensitive to the resolution of green light components of an image, and therefore an overall image having higher resolution of green color components would likely be perceived by the observer as not having any noticeable resolution degradation.

In an alternative configuration, the coating 30 can be implemented using a reflective material that has higher reflectance for red light and blue light than for green light (i.e., the coating 30 reflects mostly red light and blue light). As a result, the overall reflected image would have little to no noticeable color difference.

Figure 9:
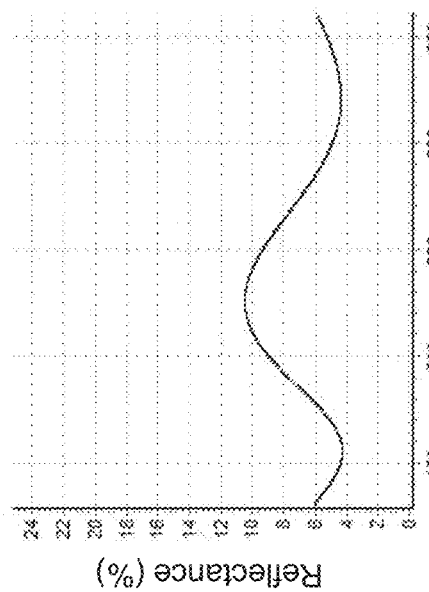
FIG. 9 illustrates reflectance curves as a function of wavelength for another coating that can be used in some of the internal partially reflective surfaces.
Figure 10:
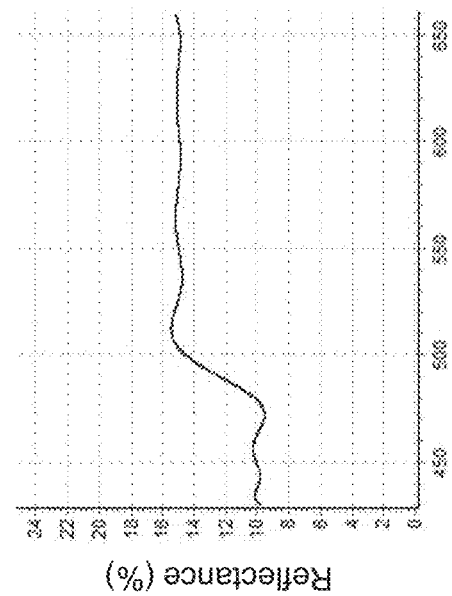
FIG. 10 illustrates reflectance curves achieved when using the coating of FIG. 9 in combination with a complementary coating used on some of the internal partially reflective surfaces.

In another non-limiting example, the internal surfaces 16a, 16b, 16c are implemented using a dielectric coating that has reflection characteristics according to the graph illustrated in FIG. 9. Here, the dielectric coating of the internal surfaces 16a, 16b, 16c reflects a first subset of components of the image illumination, in the form of green light and red light, with high efficiency (approximately 15% reflectance), but reflects a second subset of components of the image illumination, in the form of blue light, with lower efficiency than the green light and red light reflection (approximately 10% reflectance). In order to compensate for the low reflectance of the second subset of components, a particular implementation of the coating 30 is used for the internal surfaces 18a, 18b, 18c. In this implementation, the portions of the reflective material (implemented as dielectric material or metallic material) are small (preferably in accordance with the human pupil size discussed above), and have reflection characteristics such that only blue light is reflected by the coating 30. The overall reflectance imparted by the combination of the dielectric coating of the internal surfaces 16a, 16b, 16c and the coating 30 of the internal surfaces 18a, 18b, 18c is illustrated in FIG. 10, whereby the overall reflectance is approximately constant at approximately 15% across the visible light spectrum. The result is a white balanced image without diffraction (blue light tends to be diffracted much less than green and red light).

Figure 11:
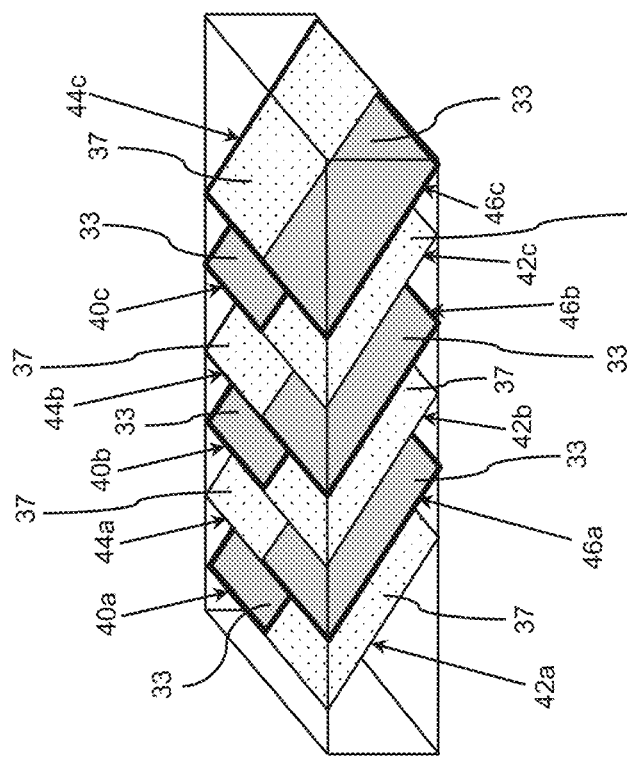
FIG. 11 is a schematic representation of a series of internal partially reflective surfaces having two complementary coatings arranged on each of the internal partially reflective surfaces in alternating order.

FIG. 11 shows another implementation of using two coating schemes to preserve color uniformity according to a non-limiting example. Here, the internal surfaces 16a, 16b, 16c, 18a, 18b, 18c have two sets of coatings on each reflector arranged in an alternating configuration, where there is a lateral change in the coating of each internal surface. In the non-limiting illustrated example, each internal surface has two non-overlapping portions, namely a first portion and a second portion. The first portions 40a, 40b, 40c of the internal surfaces 16a, 16b, 16c have a first coating 33, for example a dielectric coating having reflective characteristics according to FIG. 7 or FIG. 9, and the second portions 42a, 42b, 42c of the internal surfaces 16a, 16b, 16c have a second coating 37, for example the coating 30. The first portions 44a, 44b, 44c of the internal surfaces 18a, 18b, 18c have the second coating 37, and the second portions 46a, 46b, 46c of the internal surfaces 18a, 18b, 18c have the first coating 33.

In the non-limiting example illustrated in FIG. 11, the coatings 33, 37 are deployed on alternating portions of successive internal surfaces, such that the coatings on each pair of adjacent internal surfaces (e.g., internal surfaces 16a, 18a, internal surfaces 18a, 16b, internal surfaces 16b, 18b, etc.) cooperate to reflect all of the components of subsets of the image illumination with reasonable efficiency so as to preserve color uniformity. In this particular configuration, the two sets of internal surfaces can be thought of as being effectively coplanar, whereby each internal surface has both coatings 33, 37. It is noted that although FIG. 11 shows each of the two portions of each of the internal surfaces constitutes approximately half of the internal surface plane, other configurations are possible, so long as the portions of the internal surfaces on which the coatings are deployed alternate between successive internal surfaces.

Although the embodiments for preserving color uniformity have been described within the context of the internal surfaces 16a, 16b, 16c having dielectric coatings, and the internal surfaces 18a, 18b, 18c having the coatings implemented according to the coating 30, and in which the internal surfaces 16a, 16b, 16c and 18a, 18b, 18c are interleaved, other embodiments are possible in which both types of coatings are implemented on a single internal surface, for example as discussed above with reference to FIGS. 4-6. For example, each of the internal surfaces 16a, 16b, 16c, 18a, 18b, 18c may include two coatings: 1) a first coating, for example the coating 30, and 2) a second coating, for example a dielectric deployed in the spaces formed between the portions 34 of the coating 30. The second coating may have the reflection characteristics according to FIG. 7 or FIG. 9, whereby a first subset of the components of the image illumination is reflected by the second coating with higher efficiency than a second subset of components of the image illumination. The first coating may then have reflection characteristics which compensate for the low reflectance imparted on the second subset by the second coating, such that each individual internal surface achieves an overall reflectance that is approximately uniform across the three colors, for example as illustrated in FIGS. 8 and FIG. 10. In such a configuration, it is not necessary for the two sets 16, 18 to be interleaved. Instead, since the internal surfaces of both of the sets 16, 18 are identically coated, the two sets 16, 18 are one in the same, and are preferably deployed such that each internal surface starts where the previous internal surface ends.

In certain embodiments, the patterned reflective coating 30 of the internal surfaces may be configured such that the number of portions 34, 36 and/or or the size of the portions 34, 36 on the internal surfaces varies from facet to facet in order to provide uniform intensity across the entire field of view. For example, the internal surfaces 16a, 16b, 16c may be implemented using dielectric coatings (as discussed above), and the internal surfaces 18a, 18b, 18c may be implemented using the patterned reflective coating 30. As light propagates through the LOE, the intensity of the light that impinges on each successive facet is less than the intensity of the light that impinges on the preceding facet. This is due to the fact that a proportion of the intensity of light that impinges on a particular facet is reflected out of the LOE by that particular facet. In order to compensate for the decrease in light intensity in the light propagation direction, the reflectance imparted by each facet should generally increase compared to the reflectance imparted by the preceding facet. This can be effectuated by increasing the density of the reflective material on the coating 30 on the internal surfaces of the second set 18 with respect to the primary propagation direction of light through the LOE by, for example, increasing the number of portions 34, 36 and/or or the size of the portions 34, 36. For example, the coating 30 of the internal surface 18a can be implemented with a first number of portions 34, 36 and/or or a first size of the portions 34, 36, the coating 30 of the internal surface 18b can be implemented with a second number of portions 34, 36 and/or or a second size of the portions 34, 36, and the coating 30 of the internal surface 18c can be implemented with a third number of portions 34, 36 and/or or a third size of the portions 34, 36. The first number of portions is less than the second number of portions, which is less than the third number of portions, and the first size of the portions is less than the second size of the portions, which is less than the third size of the portions.

Although some of the embodiments described thus far have pertained to two sets of internal partial reflectors that have complementary coatings, other embodiments are possible in which there are more than two sets of partial reflectors having complementary coatings. As a simple example, a third set of internal surfaces can be deployed parallel to, and interleaved with, the internal surfaces of the other two sets 16, 18. Each set of internal surfaces can include a coating that is configured to reflect a particular subset of components of the image illumination. For example, the coating of the internal surfaces of the first set can be configured to primarily reflect red light, the coating of the internal surfaces of the second set can be configured to primarily reflect green light, and the coating of the internal surfaces of the third set can be configured to primarily reflect blue light. As a result, a given group of three (preferably consecutive) internal surfaces (the group having one internal surface from each of the three sets) is able cooperate to reflect all three components of image illumination.

The coating and facet deployment methodologies discussed above have been described within the non-limiting example context of image illumination having either different spectral components or different polarization components. However, it should be appreciated that image illumination often has both spectral and polarization components (e.g., linearly polarized red, green, and blue light). For image illumination that impinges on the facets at a higher range of AOIs, e.g., 20-50 degrees, the coatings of the sets of facets can be designed to satisfy both spectral and polarization requirements to achieve transmission equalization across a wide field of view.

Although the coating designs and the deployment of the internal surfaces have thus far been described within the context of an LOE in which light is guided through the LOE in one dimension and is coupled-out (as "unguided" light) by the internal surfaces (facets) so as to perform aperture expansion in one dimension (performing what is referred to herein as "guided-to-unguided" image propagation), the coating design and facet deployment described herein according to embodiments of the present invention are equally applicable to optical devices having at least two optical waveguides that cooperate to guide light in two-dimensions in order to perform aperture expansion in two dimensions. These types of optical devices perform what is referred to herein as "guided-to-guided" image propagation, whereby image illumination is guided through a first optical waveguide (in one or two dimensions) and is reflected by a set of facets deployed in the first optical waveguide so as to be coupled into a second optical waveguide. The image illumination is then guided through the second optical waveguide (in one dimension) and is reflected by a set of facets deployed in the second optical waveguide so as to couple the image illumination out of the second optical waveguide for viewing by an observer. The following paragraphs provide examples of optical devices that perform guided-to-guided image propagation.

Figure 12B:
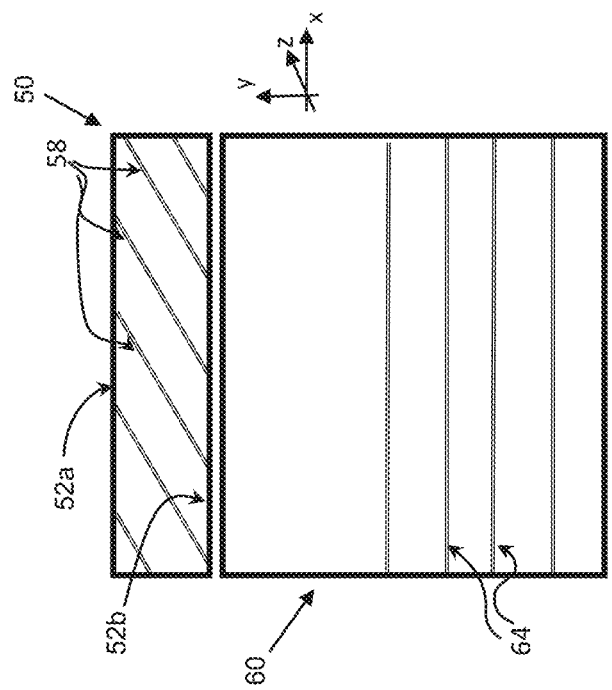
FIGS. 12A and 12B are schematic side and front view representation of an optical device having two optical waveguides, each having a set of partially reflective internal surfaces that can have complementary coatings, for performing optical aperture expansion in two dimensions.
Figure 12A:
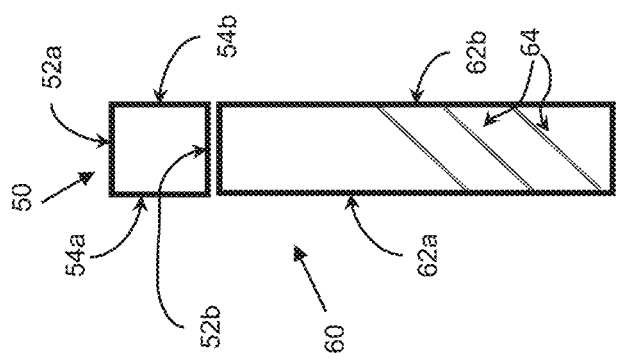

FIGS. 12A and 12B show schematic side and front views, respectively, of an optical device that performs guided-to-guided image propagation by way of two optical waveguides 50, 60 that are optically coupled together. The optical waveguide 50 has a direction of elongation illustrated arbitrarily as corresponding to the "x-axis", and includes two pairs of parallel faces (i.e., major external surfaces) 52a, 52b, 54a, 54b forming a rectangular cross-section. A plurality of mutually parallel internal partially reflecting surfaces (i.e., facets) 58 at least partially traverse the optical waveguide 50 at an oblique angle to the direction of elongation. The optical waveguide 60, optically coupled to the optical waveguide 50, has a pair of parallel faces 62a, 62b forming a slab-type waveguide. Here too, a plurality of mutually parallel internal partially reflecting surfaces (i.e., facets) 64 at least partially traverse the optical waveguide 60 at an oblique angle to the parallel faces 62a, 62b. The planes containing the facets 58 are oblique to the planes containing the facets 64.

The optical coupling between the optical waveguides 50, 60, and the deployment and configuration of partially reflecting surfaces 58, 64 are such that, when an image is coupled into the optical waveguide 50 with an initial direction of propagation at a coupling angle oblique to both the first and second pairs of parallel faces 52a, 52b, 54a, 54b, the image advances by four-fold internal reflection along the optical waveguide 50 (i.e., in two dimensions), with a proportion of intensity of the image reflected at the partially reflecting surfaces 58 so as to be coupled out of the optical waveguide 50 and into the optical waveguide 60, and then propagates through two-fold internal reflection within the optical waveguide 60 (i.e., in one dimension, similar to as in the LOE 10), with a proportion of intensity of the image reflected at the partially reflecting surfaces 64 so as to be coupled out of the optical waveguide 60 as a visible image seen by the eye of an observer. As a result of this construction, the light that propagates through the optical waveguide 50 is guided (in two dimensions by the optical waveguide 50), and the light that is reflected by the partially reflecting surfaces 58 is also guided (in one dimension by the optical waveguide 60).

The coating design principles and/or the facet interleaving principles according to the embodiments of the present invention can be applied to either or both of the sets of internal partially reflecting surfaces 58, 64. Further details of such an optical device that employs two optical waveguides 50, 60 can be found in the applicant's commonly owned U.S. Pat. No. 10,133,070, which is incorporated by reference in its entirety herein.

Figure 13:
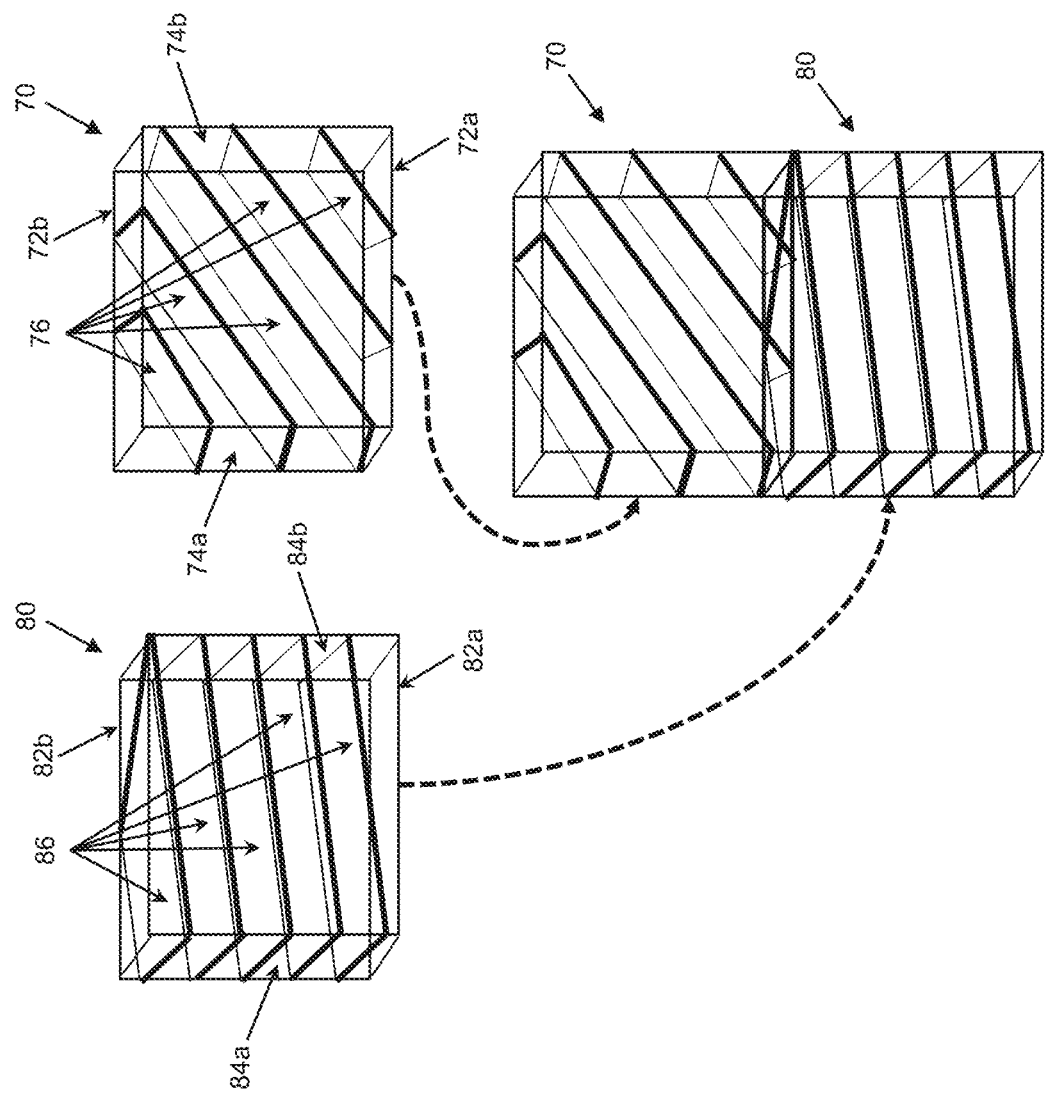
FIG. 13 is a schematic representation of another optical device having two optical waveguides, each having a set of partially reflective internal surfaces that can have complementary coatings, for performing optical aperture expansion in two dimensions

FIG. 13 shows a schematic view of an optical device that performs guided-to-guided image propagation by way of two slab-type optical waveguides 70, 80 that are optically coupled together. The optical waveguide 70 has two pairs of parallel faces 72a, 72b, 74a, 74b forming a slab-type waveguide (in the figure the faces 72a, 72b are at the front and back, respectively, of the optical waveguide 70, and the faces 74a, 74b are at the left and right, respectively, of the optical waveguide 70). A plurality of mutually parallel internal partially reflecting surfaces (i.e., facets) 76 at least partially traverse the optical waveguide 70 at an oblique angle to the parallel faces 72a, 72b, 74a, 74b. The optical waveguide 80 has two pairs of parallel faces 82a, 82b, 84a, 84b forming a slab-type waveguide (in the figure the faces 82a, 82b are at the front and back, respectively, of the optical waveguide 80, and the faces 84a, 84b are at the left and right, respectively, of the optical waveguide 80). A plurality of mutually parallel internal partially reflecting surfaces (i.e., facets) 86 at least partially traverse the optical waveguide 80 at an oblique angle to the parallel faces 82a, 82b, 84a, 84b. In addition, the planes containing the facets 76 are oblique or perpendicular to the planes containing the facets 86.

In the illustrated non-limiting implementation, the optical waveguides 70, 80 are optically coupled together in a configuration in which the optical waveguide 70 is stacked on top of the optical waveguide 80. Note, however, the optical waveguides 70, 80 can be stacked front to back (e.g., with the faces 72b, 82a in facing relation to each other). The optical coupling between the optical waveguides 70, 80, and the deployment and configuration of partially reflecting surfaces 76, 86 are such that, when an image is coupled into the optical waveguide 70, the image propagates through two-fold internal reflection within the optical waveguide 70 between the faces 72a, 72b in a first guided direction, with a proportion of intensity of the image reflected at the partially reflecting surfaces 76 so as to be coupled out of the optical waveguide 70 and into the optical waveguide 80, and then propagates through two-fold internal reflection within the optical waveguide 80 between the faces 82a, 82b in a second guided direction (oblique to the first guided direction), with a proportion of intensity of the image reflected at the partially reflecting surfaces 86 so as to be coupled out of the optical waveguide 80 as a visible image seen by the eye of an observer.

The coating design principles and/or the facet interleaving principles according to the embodiments of the present invention can be applied to either or both of the sets of internal partially reflecting surfaces 76, 86. Further details of such an optical device that employs two optical waveguides 70, 80 can be found in the applicant's commonly owned U.S. Pat. No. 10,551,544, which is incorporated by reference in its entirety herein.

Figure 14:
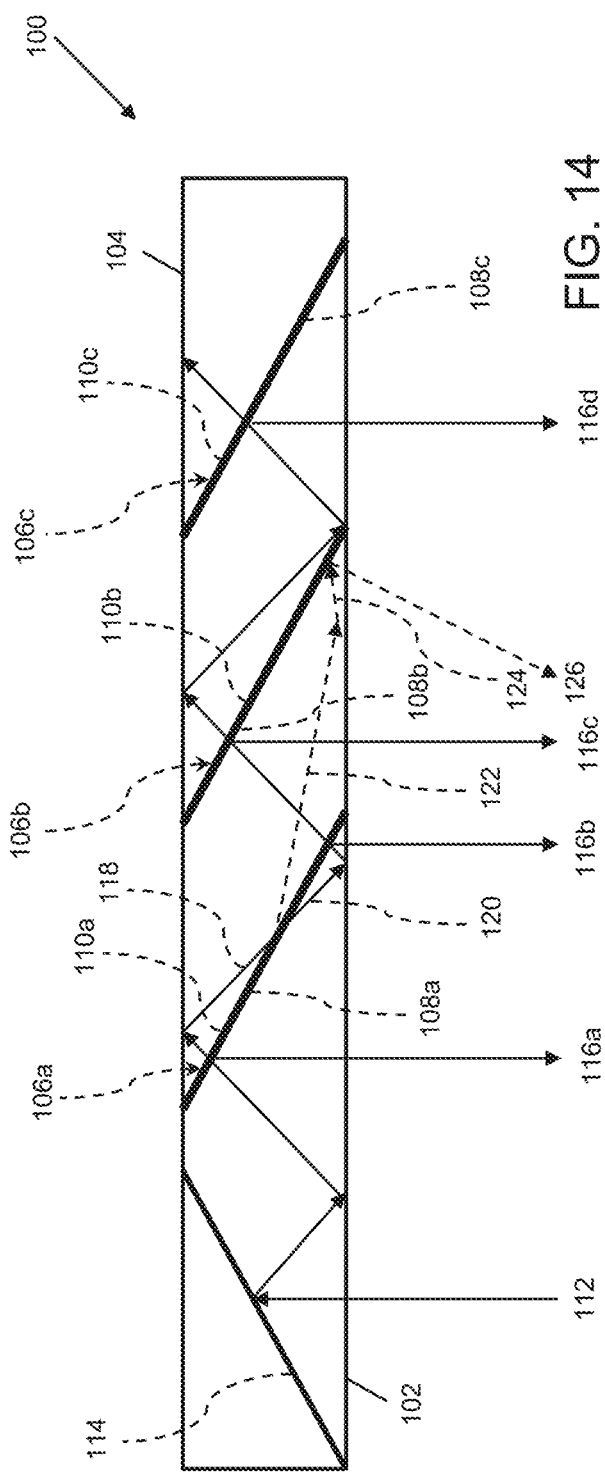
FIG. 14 is a schematic representation of an LOE having a series of internal partially reflective surfaces, and illustrating the progression of image illumination through the LOE and undesired reflection from one of the internal partially reflective surfaces.

While the use of the reflective pattern coatings disclosed herein has the benefit of preserving color uniformity and intensity uniformity, the use of the reflective pattern coatings may cause undesired reflections from the internal surfaces, which can lead to ghost images. The general concept of undesired reflections from the internal surfaces is described with reference to FIG. 14. Here, LOE 100 has three mutually parallel partially reflective internal surfaces 106a, 106b, 106c deployed oblique to a pair of parallel faces (major external surfaces) 102, 104. The thickness of the internal surfaces 106a, 106b, 106c is exaggerated in FIG. 14 for clarity of illustrating front sides 108a, 108b, 108c and back sides 110a, 110b, 110c of the internal surfaces 106a, 106b, 106c. The front and back sides of an internal surface are generally opposing sides, where the front side is the side of the internal surface that is coated with the coatings (described with reference to FIGS. 1-11) having the reflective characteristics that enable reflection of the propagating image illumination according to the desired reflectivity pattern.

Image illumination 108, schematically represented by light ray 108, is coupled into the LOE 100 by the coupling-in reflector 110 (or any other suitable optical coupling-in configuration, e.g., coupling prism, etc.). The image illumination 108 propagates through the LOE 100 by repeated internal reflection at the faces 102, 104 (either by total internal reflection or due to an angularly selective reflective coating applied at the faces), until reaching the series of internal surfaces 106a, 106b, 106c, where part of the image intensity is reflected, at the front sides 108a, 108b, 108c of the internal surfaces 106a, 106b, 106c, out of the LOE 100 as light rays 116a-116d. Looking at the propagating image illumination 118 schematically represented by the light ray 118, it can be seen that part of the intensity of the light ray 118 is transmitted by the internal surface 106a (as light ray 120) after which the light ray 120 is reflected at the face 102 and then a proportion of the intensity is reflected at the front side 108a of the internal surface 106a so as to be reflected out of the LOE 100 as light ray 116b (the remaining intensity is transmitted by the internal surface 106a, such that the light continues propagating through the LOE 100). However, part of the intensity of the light ray 118 undergoes an undesired reflection at the back side 110a of the internal surface 106a, resulting in reflected ray 122. The reflected ray 122 can, in certain circumstances, undergo internal reflection at the faces 102, 104, exemplified by the reflection at the face 102, so as to generate reflected ray 124. The reflected ray 124 is reflected at the front side 108b of the internal surface 106b so as to be reflected out of the LOE 100 as ghost light ray 126.

Figure 15A:
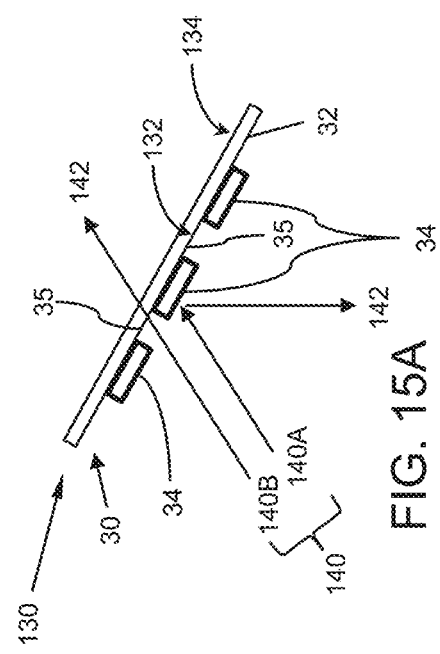
FIG. 15A is a schematic representation of one of the internal partially reflective surfaces of FIG. 14 implemented with a patterned reflective coating similar to the patterned reflective coatings of FIGS. 4 and 5, illustrating the transmission and reflection of light incident to the front side of internal partially reflective surface.
Figure 15B:
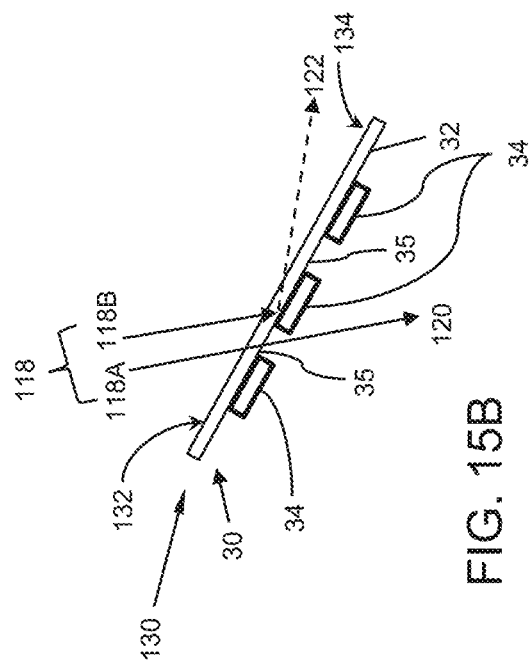
FIG. 15B is a schematic representation of the partially reflective surface of FIG. 15A, illustrating the transmission and reflection of light incident to the back side of the internal partially reflective surface.

FIGS. 15A and 15B show how the reflective pattern coating 30 enables both desired reflections at the front side of an internal surface and undesired reflections at the back side of the internal surface. It is noted that FIGS. 15A and 15B are not drawn to scale, and some of the dimensions of the internal surface and the components of the reflective pattern coating 30 are exaggerated for clarity of illustration.

Looking first at FIG. 15A, there is shown how an arbitrary internal surface 130 (which can be for example one of the internal surfaces of the set 18) handles propagating image illumination 140 that impinges on the front side 132 of the internal surface 130. The internal surface 130 has the reflective pattern coating 30 deposited on the front side 132 of the internal surface 130. In particular, the planar base surface 32 is deposited on the front side 132 such that the portions 34 are arranged in the desired pattern on the front side 132. Alternatively, the portions 34 can be deposited directly on the front side 132 in the arranged pattern without the planar base surface 32. Propagating image illumination 140, represented schematically by light rays 140A and 140B, impinges on different regions of the front side 132 of the internal surface 130. In this case, the propagating image illumination 140 is the image illumination that has undergone reflection at the lower face of the LOE (e.g., the face 102 in FIG. 14 or the face 12 in FIG. 1). The part of the propagating image illumination represented by the light ray 140A impinges on a region of the internal surface 130 having the reflective material so as to be reflected (out of the LOE) by one of the portions 34 of reflective material as reflected light ray 142. The part of the of the propagating image illumination represented by the light ray 140B impinges on a region of the internal surface 130 having spaces 35 between the portions 34 of reflective material, and is transmitted by the internal surface 130 as light ray 142 (i.e., the light ray 140B passes through the internal surface 130 from the front side 132 to the back side 134 as light ray 142, due to the spaces 35 being transparent). This light ray 140B continues to propagate through the LOE, being reflected at the faces of the LOE and/or reflected by subsequent internal surfaces. As a result, part of the image illumination 140A is reflected out of the LOE by the internal surface 130, and part of the image illumination 140B is transmitted by the internal surface 130.

Turning now to FIG. 15B, there is shown how the internal surface 130 handles propagating image illumination 118, represented schematically by light rays 118A and 118B, that impinges on the back side 134 of the internal surface 130. In this case, the propagating image illumination is the image illumination that has undergone reflection at the upper face of the LOE (e.g., the face 104 in FIG. 14 or the face 14 in FIG. 1). The part of the of the propagating image illumination represented by the light ray 118A impinges on a region of the internal surface 130 having spaces 35 between the portions 34 of reflective material, and is therefore transmitted by the internal surface 130 as light ray 120 (i.e., the light ray 118A passes through the internal surface 130 from the back side 134 to the front side 132, due to the spaces 35 being transparent). The part of the propagating image illumination represented by the light ray 118B passes through the back side 134 of the internal surface 130 and impinges on a region of the internal surface 130 having the reflective material so as to be reflected by one of the portions 34 of reflective material as reflected light ray 122. This light ray 122, as discussed above, can undergo additional reflections at the faces of the LOE and ultimately be reflected at the front side of one of the internal surfaces so as to be reflected out of the LOE as a ghost light ray.

Figure 16A:
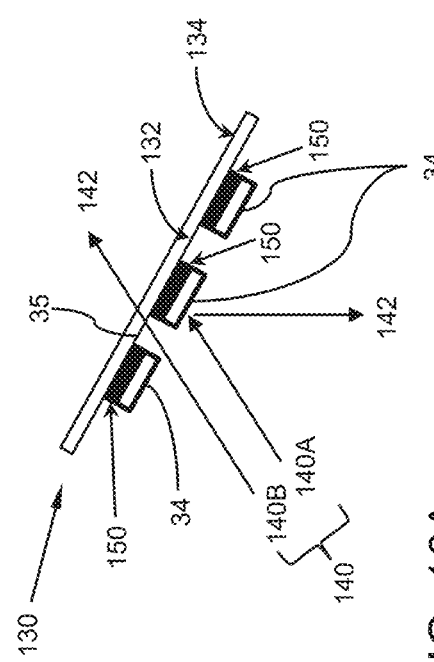
FIG. 16A is a schematic representation of an internal partially reflective surface, similar to the internal partially reflective surface of FIGS. 15A and 15B, constructed and operative according to the teachings of an aspect of the present invention, having an amount of reflection suppressing material deployed between the reflective portions of the patterned reflective coating and the front side of the internal partially reflective surface, and illustrating the transmission and reflection of light incident to the front side of internal partially reflective surface.
Figure 16B:
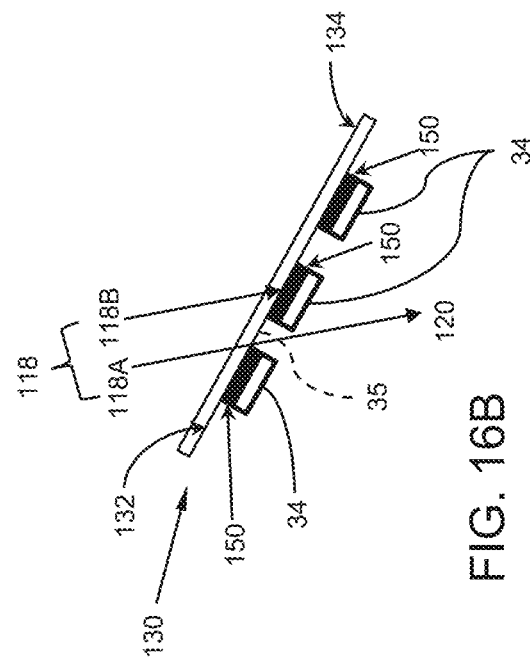
FIG. 16B is a schematic representation of the partially reflective surface of FIG. 16A, illustrating the transmission of light incident to one region on the back side of the internal partially reflective surface and the suppression of light incident to another region on the back side of the internal partially reflective surface by the reflection suppressing material.

In order to combat these undesired reflections, embodiments of the present invention provide a coating of reflection suppressing material applied between the portions of reflective material and the front side of the internal surfaces. FIGS. 16A and 16B show the reflection suppressing material and its effect on propagating image illumination. Similar to as in FIGS. 15A and 15B, FIGS. 16A and 16B are not drawn to scale for clarity of illustration.

Looking first at FIG. 16A, a coating of reflection suppressing material, designated as portions 150, is deployed between the portions 34 of reflective material and the front side 132 of the internal surface 130. If the coating 30 is implemented using a planar base surface 32 (e.g., thin-film), the portions 150 can be deposited directly on the surface 32, and the portions 34 can then be deposited on the portions 150. Preferably, the portions of the reflection suppressing material are arranged in the same pattern configuration as the portions of reflective material, such that the portions 34 and 150 are identical in size, shape, and number. As can be seen in FIG. 16A, the reflection suppressing material has little to no effect on propagating image illumination that is incident to the front side 132 of the internal surface 130. Similar to as discussed above with reference to FIG. 15A, the part of the propagating image illumination represented by the light ray 140A impinges on a region of the internal surface 130 having the reflective material so as to be reflected by one of the portions 34 of reflective material as reflected light ray 142. The part of the of the propagating image illumination represented by the light ray 140B impinges on a region of the internal surface 130 having spaces 35 between the portions 34 of reflective material, and is transmitted by the internal surface 130 as light ray 142.

Turning now to FIG. 16B, there is shown how the internal surface 130 with the reflection suppressing material handles propagating image illumination 118 that impinges on the back side 134 of the internal surface 130. Similar to as discussed above with reference to FIG. 15B, the part of the of the propagating image illumination represented by the light ray 118A impinges on a region of the internal surface 130 having spaces 35 between the portions 34 of reflective material, and is therefore transmitted by the internal surface 130 as light ray 120. However, unlike the configuration illustrated in FIG. 15B, the part of the propagating image illumination represented by the light ray 118B passes through the back side 134 of the internal surface 130 and impinges on a region of the internal surface 130 that has a portion 150 of the reflection suppressing material. The reflection suppressing material prevents the backside reflection of the light ray 118B, and therefore no undesired reflection of propagating image illumination occurs.

The reflection suppressing material can be implemented in various ways. In one non-limiting example, the reflection suppressing material is implemented as an amount of black absorbing paint, which absorbs incident light. In another non-limiting example, the reflection suppressing material is implemented as an amount of light scattering material (such as a diffusive material), that scatters incident light in multiple directions at intensities that are orders of magnitude smaller than the intensity of the incident light. As a result, any scattered light that continues propagating through the LOE and is reflected by a subsequent internal surface will have an intensity that is generally too low to be noticeable to the observer.

The reflection suppressing material is preferably deposited between the reflective material and the front side of the internal surfaces during manufacturing of the LOE. The LOE, with embedded internal surfaces, is preferably constructed by forming a stack of transparent plates (e.g., glass plates) bonded together with suitable coatings at their interfaces. The boding is typically performed using optical cement. The coatings can include the patterned reflective coatings and/or dielectric coatings, all as described above. The coatings can be built up in layers on thin-films or thin-substrates (e.g., base surface 32), which are applied at the interfaces between the transparent plates prior to bonding the plates together. Alternatively, the coatings can be built up directly on the transparent plates prior to bonding the plates together, such that the transparent plates serve as the base surface 32. When employing a reflection suppressing material to reduce ghost images, layers of the reflection suppressing material can be built-up in a pattern (either directly on the transparent plates or on the thin-film or thin-substrate), with the layers of the pattern reflective material then built-up on the reflection suppressing material, thereby sandwiching the reflection suppressing material between the transparent plate and the reflective material.

Once the stack of transparent plates is bonded together, with appropriate coatings (and preferably reflection suppressing material) at the interfaces, the stack is cut (i.e., sliced) at an appropriate angle (corresponding to the desired oblique angle at which the internal surfaces are to be deployed) to form the LOE with partially reflective internal surfaces embedded between parallel major external surfaces (i.e., faces). The slicing at the appropriate angle is referred to as "diagonal cutting" or "diagonal slicing". The major external surfaces of the LOE are then polished to increase optical quality at the major external surfaces. In embodiments in which the LOE uses a coupling-in reflector as the optical coupling-in configuration, similar steps can be performed in order to produce a substrate having an embedded coupling-in reflector.

Although the polishing process has the desired effect of increasing optical quality at the parallel faces of the LOE, the polishing process may, in certain instances, create blemishes at interface regions between the LOE substrate and the internal surface that can negatively affect optical performance and image quality at the LOE output. One type of blemish that can be caused by the polishing process is an indentation in one or both of the parallel faces of the LOE at the interface region between the internal surface and the parallel faces of the substrate. Such a blemish is illustrated schematically in FIG. 17 (not drawn to scale), which shows a section of an LOE 200 having parallel faces 202, 204 with an internal partially reflective surface 206 deployed oblique to the faces 202, 204. Although not shown in the drawing, additional internal partially reflective surfaces are deployed within the LOE 200, parallel to the internal surface 206.

The internal surface 206 includes two opposing ends 208a, 208b (i.e., starting and stopping ends) at corresponding end regions 210a, 210b that are respectively associated with the faces 202, 204. The faces 202, 204 and the respective end regions 210a, 210b (and in particular the respective ends 208a, 208b) define interface regions 212a, 212b (designated by the dashed circles) between the internal surface 206 and the LOE substrate. An indentation 214 is formed, for example as a result of the polishing process, in one of the faces 202 at the corresponding interface regions 212a (but can be formed in both faces, i.e., at both interface regions 212a, 212b). The indentation 214 is generally formed as a dent, depression, pit, cavity, or crevice in the face of the LOE, which causes a portion (albeit a small portion) of the face 202 to protrude inward into the interior section of the LOE 200 in which the internal surfaces are deployed. The protruding portion (i.e., the protrusion) is generally designated 216 in FIG. 17.

Typically, the indentation 214 is formed as a result of the polishing process due to pressure applied during polishing at the interface regions 212a, 212b, which may have reduced structural integrity compared with the remaining portions of the faces 202, 204. Other sources besides polishing may cause the formation of the indentation 214, for example, mishandling (e.g., dropping) of the LOE.

As a result of the indentation 214, image illumination that propagates at or near the interface region 212a may undergo scattering by the protrusion 216. This is illustrated schematically in FIG. 18, where image illumination 218 (schematically represented by light ray 218) is transmitted by the internal surface 206, and undergoes internal reflection at the face 204 so as to generate reflected light ray 220 (which is also part of the image illumination). The light ray 220 is incident to the face 202 at or near the protrusion 216 so as to impinge on the protrusion 216, causing the incident light ray 220 to be reflected in multiple directions (i.e., scattered) by the protrusion 216, schematically represented by scattered light rays 222a-222c. The light rays are scattered in various directions due to the varying surface profile of the protrusion 216. These scattered light rays 222a-222b are undesired reflections, and can propagate through the LOE 200 so as to be reflected by one of the subsequent internal surfaces at unwanted angles, resulting in ghost images at the eye of the observer, similar to the light ray 122 discussed above with reference to FIG. 15B.

Referring now to FIG. 19, there is shown a method for combating the scattering effects caused by the indentation 214 by coating a portion of the face 202 that includes the indentation 214 with a light absorbing material. In particular, an amount of a light absorbing material 224 is deposited on the portion of the face 202 that includes the indentation 214. Preferably, the amount of the light absorbing material 224 that is located in the indentation 214 is sufficient to fill the indentation 214 to at least the level of the unblemished portions of the face 202. In one non-limiting example, the light absorbing material 224 is implemented as black absorbing paint that is applied to the face 202 in an amount that is sufficient to fill the indentation 214. The face 202 is preferably then polished to remove any excess light absorbing material from the face 202, such that only the light absorbing material located in the indentation 214 remains, and the level of the light absorbing material 224 in the indentation 214 is flush with the unblemished portions of the face 202

The effect of the light absorbing material 224 on propagating image illumination is also illustrated in FIG. 19. Similar to as discussed above with reference to FIG. 18, the light ray 218 is transmitted by the internal surface 206, and undergoes internal reflection at the face 204 so as to generate reflected light ray 220. However, the light ray 220, upon impinging on the protrusion 216, is absorbed by the light absorbing material 224, thereby preventing scattering of light by the protrusion 216.

The light absorbing material can be applied at any of the interface regions between the internal surfaces and the LOE substrate at which such indentations are present and then polished off as described above. For example, the light absorbing material can be applied to an indentation formed in the interface regions 212b. In addition, when using a coupling-in reflector (i.e., an internal reflecting surface) as the optical coupling-in configuration, indentations may form at the interface regions between the internal reflecting surface and the LOE substrate during the polishing process. Here too an amount of light absorbing material can be applied at interface regions between the internal reflecting surface and the LOE substrate to combat scattering effects induced by the indentations.

Although the scattering reduction by use of a light absorbing material applied to blemishes at external regions of an LOE has been described within the context an LOE in which light propagates in one dimension and is coupled-out by internal surfaces so as to perform aperture expansion in one dimension, the light absorbing material can similarly be applied to blemishes on external regions or portions of optical waveguides that perform aperture expansion in two dimensions, such as the optical waveguides that perform guided-to-guided image propagation described with reference to FIGS. 12A, 12B and 13. These blemishes can include indentations formed at interface regions between the various sets of facets (e.g., facets 58, 64, 76, 86) and the corresponding faces (e.g., faces 52a, 52b, 54a, 54b, 62a, 62b, 72a, 72b, 74a, 74b, 82a, 82b, 84a, 84b).

Figure 21:
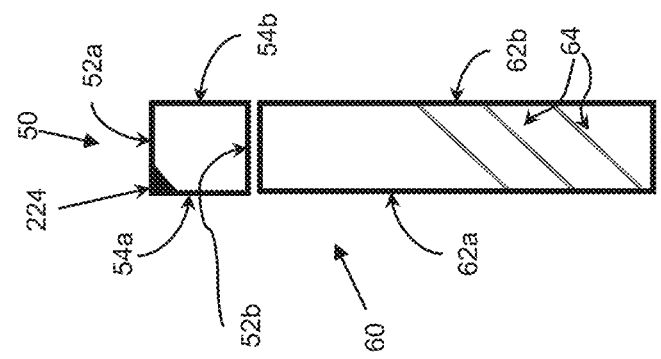
FIG. 21 is a side view corresponding to FIG. 20, showing an amount of light absorbing material applied at the chipped corner or edge, according to the teachings of an aspect of the present invention.
Figure 20:
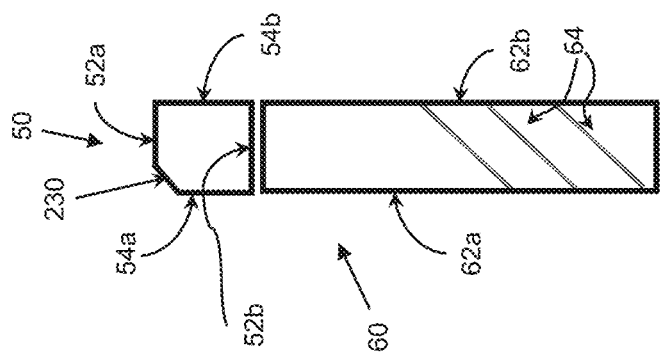
FIG. 20 is a side view similar to FIG. 12A, but showing a blemish in the form of a chipped corner or edge of the one of the optical waveguides.

The light absorbing material can also be used to fix blemishes in the form of scratches on the faces of the optical waveguides and/or chipped corners or edges of the optical waveguides. For example, consider the optical waveguide 50 of FIGS. 12A and 12B, reproduced in FIG. 20. Here, a portion of the corner/edge that is formed by the faces 52a, 54a has been chipped off (due to, for example, mishandling of the optical waveguide 50), resulting in blemish 230. Light propagating through the optical waveguide 50 by four-fold internal reflection that impinges on the region of the blemish 230 will be scattered or undergo reflections in undesired directions. As shown in FIG. 21, an amount of light absorbing material 224 can be applied at the blemish 230 so as to prevent the scattering effect. In FIG. 21, the amount of light absorbing material located at the blemish is sufficient so as to restore the rectangular cross-section of the optical waveguide 50. However, a lesser amount of light absorbing material may be applied to blemishes which do not restore the optical waveguide to its unblemished structure. The light absorbing material can equally be applied to fill scratches at the faces of the optical waveguides (for both one-dimensional and two-dimensional aperture expanding optical devices), e.g., for any of the optical waveguides 10, 50, 60, 70, 80, 100.

It is noted that certain aspects of the present invention described herein can be used to advantage independently of other aspects of the present invention. For example, the complementary coating methodologies, used either with or without interleaved sets of facets, can be used to advantage separately from the blemish mending techniques. Moreover, the blemish mending techniques can be applied to LOEs or optical waveguides (performing one-dimensional or two-dimensional aperture expansion) having otherwise conventional coating architectures.

Although only the LOE and optical waveguide structures have been illustrated in the drawings, it will be understood that the various LOEs and optical waveguides described herein are intended for use as part of a display, typically a head-up display (HUD), which is preferably a near-eye display (NED), such as a head-mounted display (HMD) or glasses-frame supported display, for providing an image to an eye of an observer. In certain preferred embodiments, the display is part of an augmented reality (AR) display system, in which the image provided to the eye of the observer is overlaid on external "real-world" scenery. In other embodiments, the display is part of a virtual reality (VR) display system, in which only the image provided by the LOE/optical waveguide is viewable to the observer. In all such cases, the display preferably includes an image projector of small form factor that generates a collimated image, which is optically coupled to the LOE/optical waveguide so as to introduce the collimated image into the LOE/optical waveguide via an optical coupling-in configuration (e.g., the coupling-in reflector 22, coupling prism, etc.) so as to propagate by internal reflection within the LOE/optical waveguide and gradually be coupled out by the internal selectively reflective surface.

Examples of suitable image projectors for projecting illumination (i.e., light) corresponding to (i.e., indicative of) a collimated image, for example, employing an illumination source, a spatial light modulator such as a liquid crystal on silicon (LCoS) chip, and collimating optics, typically all arranged on surfaces of one or more polarization selective beamsplitter (PBS) cube or other prism arrangement, are well known in the art.

It is noted that when used within the context of AR systems, application of small amounts of the light absorbing material on blemishes at external portions of the optical waveguides may also provide benefits of reducing or suppressing scattering of light from external scenery.

When discussing polarization properties of image illumination and coatings, it is noted that for each instance where a particular polarized wave path has been followed in the examples described herein, the polarizations are interchangeable, whereby, for example, on altering polarization selective properties of the coatings, each mention of p-polarized light could be replaced by s-polarized light, and vice versa.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical device, comprising:
   a light-transmitting substrate having at least two parallel major external surfaces for guiding light indicative of a collimated image by internal reflection at the major external surfaces;
   a first set of mutually parallel internal surfaces deployed within the substrate oblique to the external surfaces; and
   a second set of mutually parallel internal surfaces deployed within the substrate parallel to, interleaved with and in overlapping relation with, the first set of internal surfaces,
   at least part of each of the internal surfaces of the first set including a first coating having a first reflection characteristic so as to be at least partially reflective to at least a first subset of components of incident light, and at least part of each of the internal surfaces of the second set including a second coating having a second reflection characteristic, that is complementary to the first reflection characteristic, so as to be at least partially reflective to at least a second subset of components of incident light, such that the sets of internal surfaces cooperate to reflect all components of light from the first and second subsets.

2. The optical device of claim 1, wherein the first subset of components includes light corresponding to a first color, and wherein the second subset of components includes light corresponding to a second color.

3. The optical device of claim 1, wherein the first subset of components includes light having a first polarization direction, and wherein the second subset of components includes light having a second polarization direction.

4. The optical device of claim 1, wherein at least one of the first or second coatings includes a material selected from the group consisting of: a structural polarizer, a dielectric coating, and a metallic coating.

5. The optical device of claim 1, wherein the first coating is configured to: reflect light having wavelengths corresponding to a first color with a first reflection efficiency, reflect light having wavelengths corresponding to a second color with a second reflection efficiency, and reflect light having wavelengths corresponding to a third color with a third reflection efficiency less than the first reflection efficiency, and wherein the second coating is configured to reflect light having wavelengths corresponding to the first color with a reflection efficiency that is greater than the third reflection efficiency, such that the combined reflection efficiency of the third color by the first and second coatings is greater than or equal to the first reflection efficiency.

6. The optical device of claim 5, wherein the second reflection efficiency is less than the first reflection efficiency, and wherein the second coating is configured to reflect light having wavelengths corresponding to the second color with a reflection efficiency that is greater than the second reflection efficiency, such that the combined reflection efficiency of the second color by the first and second coatings is greater than or equal to the first reflection efficiency.

7. The optical device of claim 6, wherein the second coating is configured to reflect light having wavelengths corresponding to the first color with a reflection efficiency that is approximately equal to the first reflection efficiency.

8. The optical device of claim 1, wherein the first coating is configured to: reflect light having wavelengths corresponding to a first color with a first reflection efficiency, reflect light having wavelengths corresponding to a second color with a second reflection efficiency less than the first reflection efficiency, and reflect light having wavelengths corresponding to a third color with a third reflection efficiency less than the first reflection efficiency, and wherein the second coating is configured to: reflect light having wavelengths corresponding to the first color at a reflection efficiency greater than the second and third reflection efficiencies, reflect light having wavelengths corresponding to the second color at a reflection efficiency greater than the second and third reflection efficiencies, and reflect light having wavelengths corresponding to the third color at a reflection efficiency greater than the second and third reflection efficiencies.

9. The optical device of claim 1, wherein the first coating includes a patterned coating comprising a number of portions of a reflective material arranged on each of the internal surfaces of the first set in a prescribed pattern.

10. The optical device of claim 9, wherein each portion of the reflective material has a circular shape or an oblong shape in a plane of the internal surfaces.

11. The optical device of claim 9, wherein the reflective material is a dielectric material or a metallic material.

12. The optical device of claim 9, wherein spaces formed between the portions of the reflective material are transparent.

13. The optical device of claim 9, wherein a second reflective material is deployed on the internal surfaces in spaces formed between the portions of the reflective material.

14. The optical device of claim 13, wherein the second reflective material includes a dielectric material.

15. The optical device of claim 13, wherein the second reflective material is arranged on the internal surfaces in a prescribed pattern.

16. The optical device of claim 9, wherein at least one of the number of portions or a size of the portions on the internal surfaces of the first set increases with respect to a primary direction of propagation of light through the substrate.

17. The optical device of claim 9, further comprising an amount of a light reflection suppressing material deployed between the reflective material and at least part of the internal surfaces of the first set.

18. The optical device of claim 1, wherein the first coating is deployed on a first portion of each of the internal surfaces of the first set, and wherein the second coating is deployed on a second portion of each of the internal surfaces of the first set, and wherein the second coating is deployed on a first portion of each of the internal surfaces of the second set, and wherein the first coating is deployed on a second portion of each of the internal surfaces of the second set, and wherein the first and second portions of the internal surfaces of the first set are non-overlapping portions, and wherein the first and second portions of the internal surfaces of the second set are non-overlapping portions.

19. An optical device, comprising:
a light-transmitting substrate having at least two parallel major external surfaces for guiding light indicative of a collimated image by internal reflection at the major external surfaces; and
a plurality of mutually parallel internal surfaces deployed within the substrate oblique to the external surfaces, at least part of a first subset of the internal surfaces comprising a patterned coating that includes a number of portions of a reflective material arranged on the internal surfaces of the first subset in a prescribed pattern, the patterned coating being at least partially reflective to at least a first subset of components of incident light, a second subset of the internal surfaces being at least partially reflective to at least a second subset of components of incident light, and the internal surfaces of the first subset being in overlapping relation with the internal surfaces of the second subset such that the subsets of internal surfaces cooperate to reflect all components of light from the first and second subsets.

20. The optical device of claim 19, wherein spaces formed between the portions of the reflective material are transparent.

21. The optical device of claim 19, wherein a second reflective material is deployed in spaces formed between the portions of the reflective material.

22. The optical device of claim 21, wherein the second reflective material includes a dielectric material.

23. The optical device of claim 21, wherein the second reflective material is arranged on the internal surfaces of the first subset in a prescribed pattern.

24. The optical device of claim 19, wherein the internal surfaces of the first subset are interleaved with the internal surfaces of the second subset.

25. The optical device of claim 19, wherein surfaces of the first subset of internal surfaces are coplanar with surfaces of the second subset of internal surfaces.

\* \* \* \* \*